(12) United States Patent
Tabe

(10) Patent No.: US 6,511,133 B1
(45) Date of Patent: Jan. 28, 2003

(54) BICYCLE HUB WITH SPOKE SEAL

(75) Inventor: Koshi Tabe, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/494,544

(22) Filed: Jan. 31, 2000

(51) Int. Cl.$^7$ .............................................. B60B 27/00
(52) U.S. Cl. ..................................... 301/59; 301/110.5
(58) Field of Search ................................ 301/59, 110.5, 301/110.6, 57

(56) References Cited

U.S. PATENT DOCUMENTS

| 317,494 A | * | 5/1885 | Briggs |
| 502,006 A | * | 7/1893 | Messmer |
| 549,740 A | * | 11/1895 | McGlinchey et al. |
| 553,616 A | | 1/1896 | Handloser |
| 568,912 A | * | 10/1896 | Laass |
| 726,103 A | * | 4/1903 | Schacht |
| 773,903 A | * | 11/1904 | Theyer |
| 2,937,905 A | | 5/1960 | Altenburger ................. 301/58 |
| 4,978,176 A | * | 12/1990 | Smith .......................... 301/104 |
| 5,445,439 A | | 8/1995 | Dietrich ....................... 301/55 |
| 5,795,036 A | | 8/1998 | Campagnolo ................ 301/59 |
| 5,882,088 A | | 3/1999 | Yahata ..................... 301/110.5 |
| 6,010,197 A | | 1/2000 | Crosnier et al. .............. 301/59 |

FOREIGN PATENT DOCUMENTS

| DE | 99859 | 12/1897 |
| DE | 8703618 | 7/1987 |
| DE | 8814753 | 2/1989 |
| DE | 9416689 | 4/1996 |
| DE | 19528382 | 2/1997 |
| EP | 0764551 | 3/1997 |
| FR | 2417402 | 9/1979 |
| GB | 2302846 | 2/1997 |
| JP | 4511628 | 5/1970 |
| JP | 4963866 | 6/1974 |
| JP | 5986724 | 5/1984 |
| JP | 09-109602 | * 4/1997 |

* cited by examiner

*Primary Examiner*—Russell D. Stormer
(74) *Attorney, Agent, or Firm*—Shinjyu Global IP Councelors, LLP

(57) ABSTRACT

A bicycle hub is provided with spoke openings that extend into the interior of the hub. The bicycle hub basically has a hub axle, a hub body and a seal arranged in the hub body. The hub axle has a center axis extending between a first end and a second end. The hub body has an interior passageway with the hub axle being rotatably supported therein. The hub body also has a set of first spoke openings circumferentially arranged around one end of the hub body and a set of second spoke openings circumferentially arranged around the other end of the hub body. The spoke openings of the hub body are arranged for use with tangential bicycle spokes having a straight section and a bent end with an enlarged head such that straight section extends at an angle of about 95° relative to the bent end. A first seal is arranged in the interior passageway of the hub body and adjacent the first spoke openings to isolate the first spoke openings from the hub axle. A second seal is arranged in the interior passageway of the hub body and adjacent the second spoke openings to isolate the second spoke openings from the hub axle. Preferably, the seals is arranged in the interior passageway of the hub body to form first and second isolated spaces of the interior passageway below the first and second spoke openings.

30 Claims, 16 Drawing Sheets

BICYCLE HUB WITH SPOKE SEAL

BACKGROUND OF THE INVENTION

1. Field of the Invention

This invention generally relates to a bicycle hub with spoke openings in the tubular portion of the hub body. More specifically, the present invention relates a seal for a bicycle hub that isolates the spoke openings from the reminder of the interior of the hub body.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. Recently, the braking systems for bicycles have included the use of disc brakes. The use of disc brakes has resulted in modifications to the bicycle hub of the bicycle wheel so that a brake rotor can be mounted thereon.

The most basic bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are provided with a flange that is used to couple the spokes to the hub. In particular, holes are provided in the hub flanges. The wire spokes are usually bent on their inner end and provided with an enlarged head or flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage the interior surface of the rim.

With a spoke constructed in this manner, the nipples are installed in nipple holes formed in the rim. The spokes are inserted sideways through the holes in the hub flange until the enlarged head or flanges of the spokes engaging the areas surrounding the holes in the hub flange. The male threads on the ends of the spokes are threaded into the female threads of the spoke nipples installed in the openings of the rim.

When the hub is a brake disc hub or is a rear hub, installation and/or replacement of the spokes can be difficult. In the case of a disk brake hub, one end of the hub usually has a rotor mounting portion. Often, the rotor mounting portion is a plurality of blind bores that receive bolts to directly mount the brake disc rotor to the end of the hub. Thus, the brake disc rotor makes it difficult to insert the spokes in a sideways direction. Likewise, if the hub is a rear hub, the sprockets can be obstacles to install or replace spokes.

One problem with spoke openings in the tubular portion of the hub body is that contaminants can enter the hub body through the spoke openings. When dirt gets into the hub body, the rotation of the hub body relative to the hub axle can be significantly impair.

In view of the above, there exists a need for a spoke seal for a bicycle hub which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle hub with a seal for isolating the spoke openings form the interior of the hub body.

Another object of the present invention is to provide a bicycle hub with a seal that aids in the installation of the spokes.

Another object of the present invention is to provide a bicycle hub that can use conventional tangential spokes that are attached directly to the tubular body potion of the hub body.

Another object of the present invention is to provide a bicycle hub that is relatively lightweight in that no spoke flanges are needed.

The foregoing objects can be attained by providing a bicycle hub for use with bicycle spokes. The bicycle hub comprising a hub axle, a hub body and a seal arranged in the hub body. The hub axle has a center axis extending between a first end and a second end. The hub body has an interior passageway with the hub axle being rotatably supported therein. The hub body has a set of first spoke openings circumferentially arranged around the hub body. The seal is arranged in the interior passageway of the hub body and adjacent the first spoke openings to isolate the first spoke openings from the hub axle.

The foregoing objects can further be attained by providing a bicycle hub for use with bicycle spokes. The bicycle hub comprising a hub axle, a hub body and a seal arranged in the hub body. The hub axle has a center axis extending between a first end and a second end. The hub body has an interior passageway with the hub axle being rotatably supported therein. The hub body has a set of first spoke openings circumferentially arranged around the hub body. The seal is arranged in the interior passageway of the hub body to form a first isolated space of the interior passageway below the first spoke openings.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
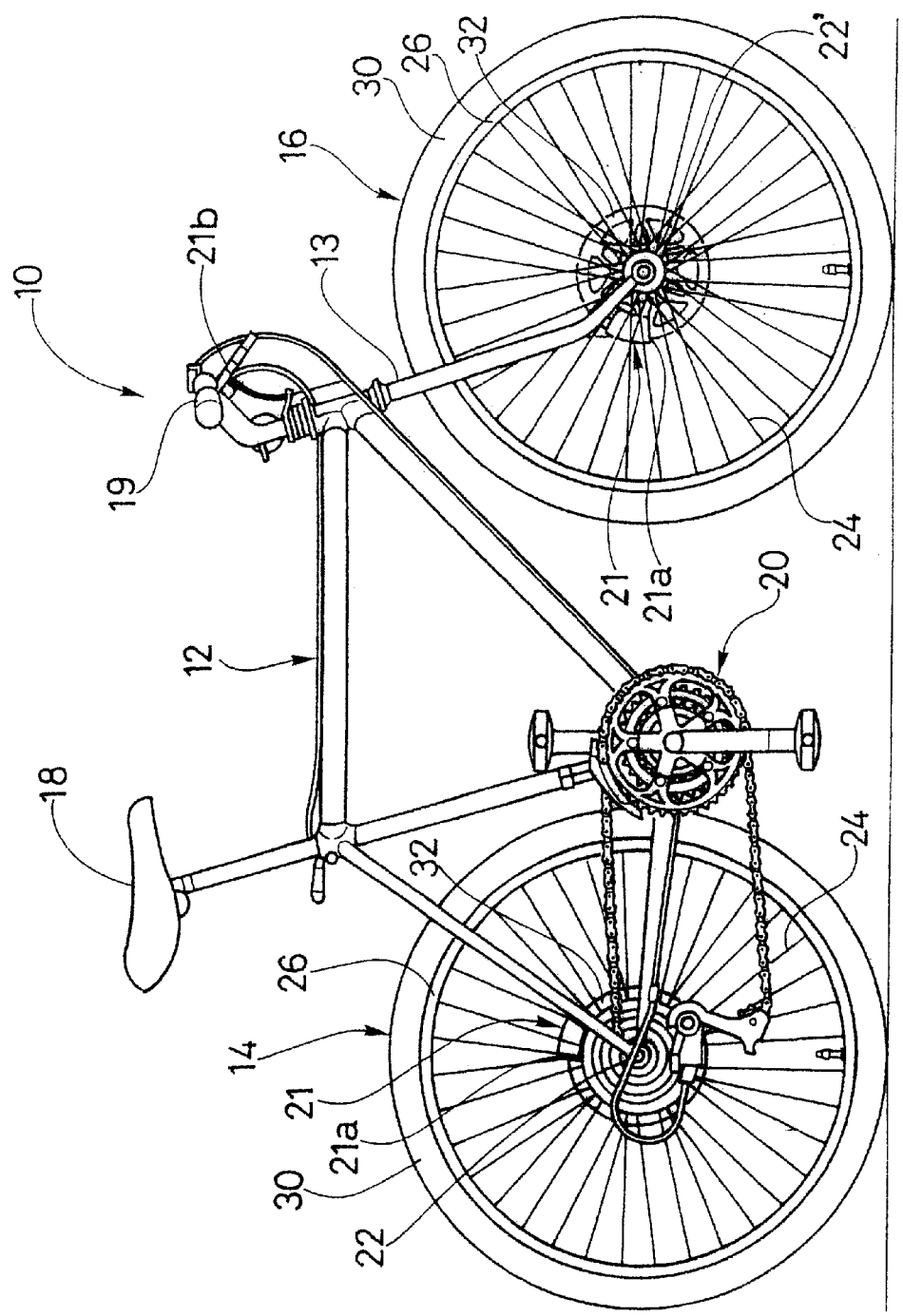
FIG. 1 is a side elevational view of a conventional bicycle with front and rear brake disc hubs in accordance with a first embodiment of the present invention.
Figure 2:
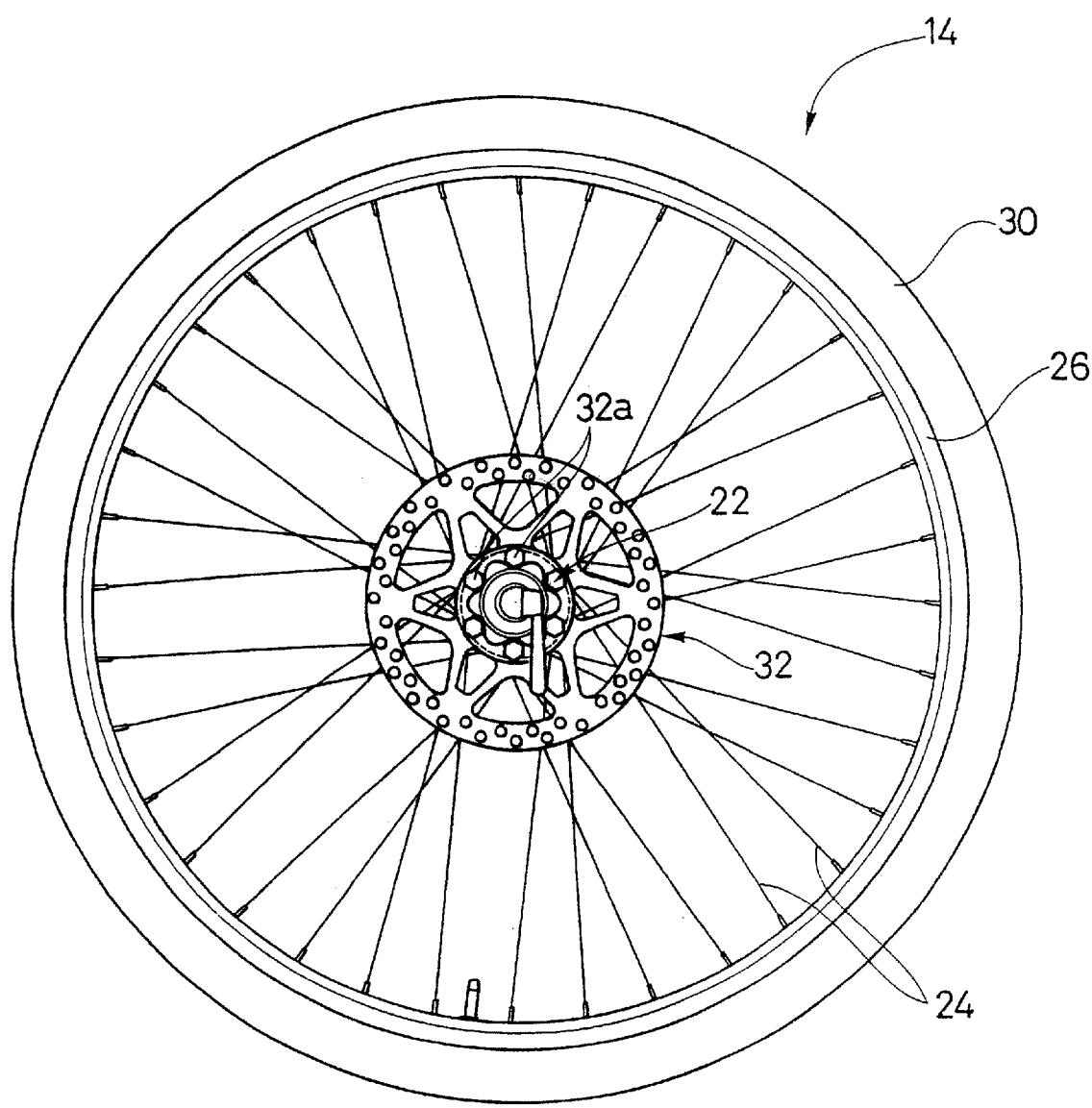
FIG. 2 is a side elevational view of the rear wheel of the bicycle illustrated in FIG. 1 with the sprockets removed.
Figure 3:
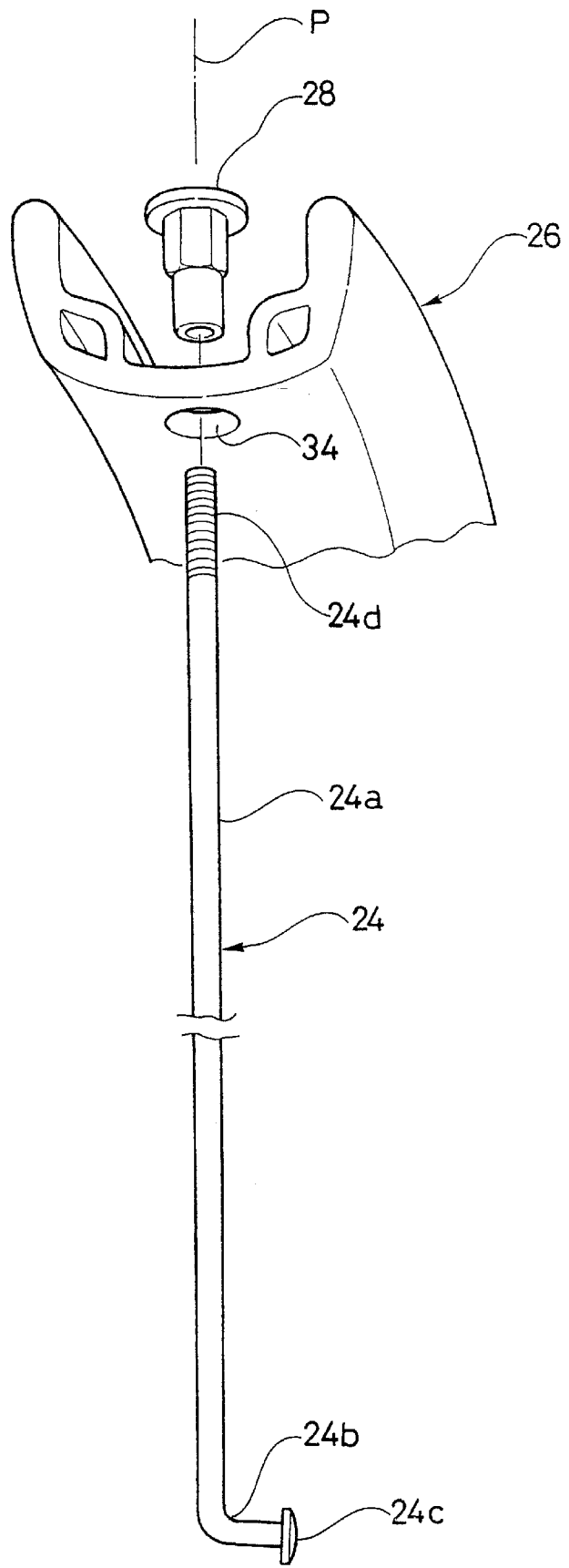
FIG. 3 is partially exploded perspective view of the rim, one of the spokes and one of the spoke nipples of the bicycle illustrated in FIG. 1.

Referring initially to FIGS. 1–3, a bicycle 10 is illustrated with certain parts being modified in accordance with the present invention as discussed below. The bicycle 10 basically has a frame 12 with a front fork 13 movably coupled thereto. A rear wheel 14 is rotatably coupled to a rear portion of the frame 12, while a front wheel 16 is rotatably coupled to the front fork 13. The frame 12 also has a seat 18 adjustably coupled to frame 12, a handlebar 19 coupled to front fork 13 for turning front wheel 16 and a drive train 20 for propelling bicycle 10. The bicycle 10 is also provided with a pair of disc brake assemblies 21 having a caliper 21a and a brake lever 21b.

Since these parts of bicycle 10 are well known in the art, these parts will not be discussed or illustrated in detail herein, except as they are modified in accordance with the present invention. Moreover, various conventional bicycle parts such as brakes, derailleurs, additional sprocket, etc., which are not illustrated and/or discussed in detail herein, can be used in conjunction with the present invention.

As seen in FIG. 2, the rear wheel 14 has a rear hub 22, a plurality of spokes 24 extending outwardly from the rear hub 22, a rim 26 coupled to the outer ends of spokes 24 by spoke nipples 28, and a tire 30 located on the outer surface of rim 26. The rear hub 22 is also provided with a brake disc rotor 32 that is attached to the rear hub 22 by six blots 32a and six nuts 32b, as explained below. While the illustrated embodiment is a thirty-six spoke wheel, it will be apparent to those skilled in the art from this disclosure that other spoke arrangements are possible without departing from the present invention. For example, a thirty-two spoke wheel or a forty spoke wheel can be constructed in accordance with the present invention without departing from the present invention. Basically, the number of spoke openings depends upon the rim to be used with the hub of the present invention.

Preferably, the spokes 24, the rim 26 and spoke nipples 28 are all conventional parts that are used with the rear hub 22 of the present invention as seen in FIG. 3. In other words, the unique design of the rear hub 22 allows it to be used with conventional parts, e.g., tangential spokes 24 and a conventional rim 26. Accordingly, when the rear wheel 14 is assembled, the spokes 24 extend tangentially from an imaginary circle centered on the center axis of rotation of rear hub 22. In the illustrated embodiment of FIGS. 2–5, the rear hub 22 and the rim 26 has thirty-six of the spokes 24 coupled therebetween.

The term "tangential spokes" are spokes that have a straight section 24a and a bent end 24b with an enlarged head 24c such that straight section 24a extends at an angle of about 95° relative to the bent end 24b. Such spokes are well known in the bicycle art. As seen in FIG. 3, the spokes 24 of the illustrated embodiment each have an outer threaded end 24d that is located at the opposite end of the center straight section 24a from the bent end 24b (inner end portion) with the enlarged head 24c. The bent end 24b has a center axis that forms an angle of about 95° with the center axis of the straight section 24a. The bent ends 24b of the spokes 24 are designed to be received within the first and second spoke openings. In particular, the enlarged heads 24c of the spokes 24 engage an interior surface of the hub body 38 with the straight sections 24a extending substantially tangentially to an imaginary circle with a center on the center axis of rotation of the rear hub 22.

The rim 26 can be any conventional rim that has a plurality of spoke holes 34 for receiving the spoke nipples 28 for attaching the outer threaded ends 24d of the spokes 24 thereto. In the illustrated embodiment, the rim 26 is a conventional steel or alloy rim having a U-shaped cross section with thirty-six spoke holes 34. The spoke holes 34 are equally spaced apart in a circumferential direction. The spoke holes 34 are preferably lie in a single plane P that divides the cross section in half as seen in FIG. 3. Of course, rims with fewer or more spoke holes 34 can be used with a hub of the present invention, if needed and/or desired. For example, the rim 26 can have thirty-two spoke holes instead of thirty-six spoke holes, if the rear hub 22 is modified to have fewer holes as explained below.

REAR HUB 22

Figure 5:
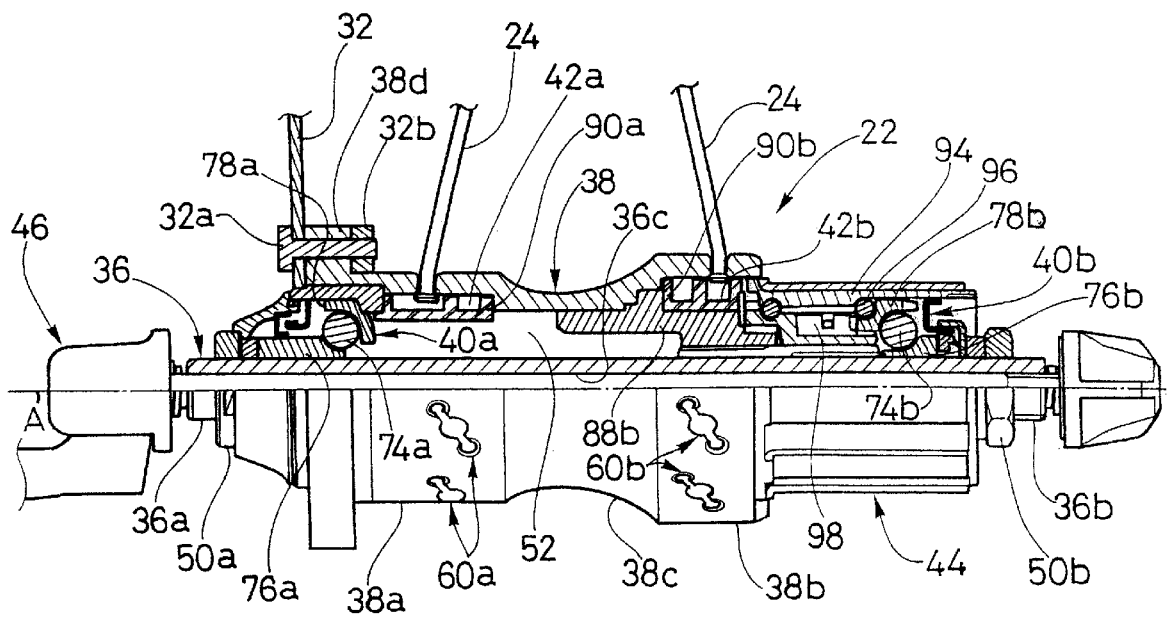
FIG. 5 is a side elevational view of the rear brake disc hub of the rear wheel illustrated in FIG. 3 with certain portions broken away for purposes of illustration.
Figure 6:
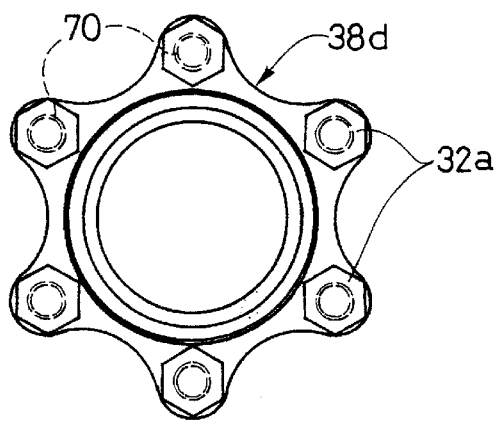
FIG. 6 is a left end elevational view of the rear brake disc hub body illustrated in FIGS. 4 and 5 with the brake disc rotor bolts mounted thereto.

As best seen in FIG. 5, the rear hub 22 basically includes a hub axle 36, a hub body or shell 38, a first bearing assembly 40a, a second bearing assembly 40b, a first spoke seal 42a, a second spoke seal 42b, a freewheel 44 and a quick release mechanism 46. Of the parts of rear hub 22, only the hub body 38 and the first and second spoke seals 42a and 42b are non-conventional parts. The remaining parts of rear hub 22 are relatively conventional, and thus, the remaining parts of rear hub 22 will not be discussed or illustrated in detail herein.

The hub axle 36 has a center axis A extending between a first end 36a and a second end 36b. The quick release mechanism 46 extends through a center bore 36c of the hub axle 36 such that the quick release mechanism 46 is coupled to the hub axle 36 in a conventional manner. The first and second ends 36a and 36b of the hub axle 36 are threaded for receiving a pair of nuts 50a and 50b that applies an axial force on the hub body 38, the bearing assemblies 40a and 40b, the spoke seals 42a and 42b, and the freewheel 44. First and second bearing assemblies 40a and 40b rotatably mount the hub body 38 with the freewheel 44 on the hub axle 36. The freewheel 44 allows the hub axle 36 to rotate freely relative to the hub body 38 in one direction, but fixedly couples the hub axle 36 relative to the hub body 38 in the opposite rotational direction.

The hub body 38 is illustrated in accordance with one embodiment of the present invention. In this embodiment, the hub body 38 is a hollow member that defines an interior passageway 52 with the hub axle 36 being rotatably supported therein by the first and second bearing assemblies 40a and 40b. Thus, the hub body 38 is a substantially tubular member. Specifically, the hub body 38 has a center tubular portion 38c with first and second end sections 38a and 38b being integral formed with the center tubular portion 38c as a one-piece, unitary member. The first end section 38a has an integrally mounted brake rotor attachment portion 38d, while a second end section 38b has the freewheel 44 fixedly coupled thereto.

A set of first spoke openings 60a are provided at the first end section 38a of the hub body 38 for receiving the bent ends 24b of the spokes 24. Similarly, the second end section 38b of the hub body 38 is provided with a second set of spoke openings 60b for receiving the bent ends 24b of the spokes 24. In the illustrated embodiment, the first end section 38a is provided with nine of the first spoke openings 60a and the second end section 38b is provided with nine of the second spoke openings 60b. The spoke openings 60a and 60b are equally spaced apart about the circumference of the hub body 38. Each of the spoke openings 60a and 60b are also designed to receive two spokes 24 as explained below. Accordingly, the rear hub 22 is designed to have thirty-six spokes extending outwardly therefrom in a generally tangential direction.

Preferably, the first and second sets of spoke openings 60a and 60b are identical. The first and second spoke openings 60a and 60b are designed to be used with conventional tangential spokes 24. Of course, it is possible that the first and second sets of spoke openings 60a and 60b can be different such that tangential spokes 24 are used in one end of the hub body 38 and a different types of spokes are used in the other end of the hub body 38. The first spoke openings 60a are circumferentially arranged around the hub body 38 adjacent to the brake rotor attachment portion 38d. Preferably, the first spoke openings 60a are spaced axially inward of the brake rotor attachment portion 38d so that brake disc rotor 32 can be easily attached with the bolts 32a and nuts 32b.

In this embodiment, the first and second spoke openings 60a and 60b are elongated slots that are each provided with an insertion portion 61 and a pair of retaining portions 62. Accordingly, each of the spoke openings 60a and 60b is designed to have a pair of spokes 24 retained therein with the spokes 24 extending in opposite directions.

The insertion portion 61 of each spoke opening is located between the pair of retaining portions 62 of each spoke opening. Each insertion portion 61 is formed by a pair of opposed curved surfaces 64 that are spaced apart so as to be equal to or slightly larger than the widths or diameters of the enlarged heads 24c of the spokes 24. Thus, the inner ends (bent ends 24b with enlarged heads 24c) of the spokes 24 can be easily inserted into the spoke openings 60a and 60b through the insertion portions 61.

The retaining portions 62 have smaller widths or diameters than the insertion portions 61. More specifically, the diameters or widths of the retaining portions 62 are smaller than the diameters or widths of the enlarged heads 24c of the spokes 24 so as to retain the spokes 24 within the spoke openings 60a and 60b. The retaining portions 62 are each preferably defined by a partial cylindrical surface 66 that is connected to the curved surfaces 64 of the associated insertion portion 61 by a pair of straight surfaces 68.

The spoke openings 60a and 60b are formed as elongated slots that are angled relative to the axis A. Accordingly, the insertion portions 61 are arranged in a circumferential pattern with one set of the retaining portions 62 being located axially outward from the insertion portions 61 and the other set of retaining portions 62 being spaced axially inward from the insertion portions 61. In other words, a first set of retaining portions 62 form an outer circumferential row of the retaining portions 62, and a second set of the retaining portions 62 form an inner circumferential row of retaining portions 62 with the insertion portions 61 being located between the rows of retaining portions 62.

Preferably, the insertion portion 61 and the retaining portions 62 of each spoke opening are formed simultaneously. Also preferably, the inner and outer ends of the retaining portions 62 of the spoke openings 60a and 60b are tapered to avoid sharp edges engaging the spokes 24.

Each of the insertion portions 61 has a center longitudinal axis $C_1$ that passes through the center axis A of the hub axle 36. The retaining portions 62, on the other hand, have center longitudinal axes $C_2$ that are parallel to the center longitudinal axis $C_1$ of the insertion portion 61 for each of the spoke openings 60a and 60b. Thus, the center longitudinal axes $C_2$ of the retaining portions 62 do not pass through the center axis of the hub axle 36. Rather, the center longitudinal axes $C_2$ of the retaining portions 62 are angled with respect to center axis A. Preferably, the center longitudinal axis $C_2$ of each retaining portion 62 is angled between about 5° and about 20° from a radial orientation in the hub body 38. In the illustrated embodiment, the retaining portions 62 are angled about 10° with respect to center axis A for a twenty-six inch rim with thirty-six spoke holes and a hub having a diameter approximately 22 millimeters. For a twenty-six inch rim with thirty-two spoke holes and a hub having a diameter approximately 22 millimeters, the retaining portions 62 are preferably angled about 11° with respect to center axis A. This angled configuration of the retaining portions 62 results in the straight sections 24a of the spokes 24 being easily arranged in a tangential direction relative to an imaginary circle centered on the hub body 38. Moreover, this angled configuration of the retaining portions 62 allows the straight sections 24a of the spokes 24 to be easily aligned with the spoke holes 34 of the rim 26 without significant bending of the spokes 24. In the illustrated embodiment, the spokes 24 are not bent more than about five degrees. Of course, the less bending of the spokes 24, the better.

If the retaining portions 62 were formed with their center axis passing through the center axis A of the hub axle 36, then the conventional spokes 24 would be placed under excessive bending forces, which could result in the spokes 24 breaking during use of the wheel. In particular, if the retaining portions 62 have their center axes passing through the center of the hub axle 36, then the center straight section 24a would have to be bent from 95° to 108° for a twenty-six inch rim with thirty-six spoke holes and a hub having a diameter approximately 22 millimeters. In contrast, with the retaining portions 62 of the spokes 24 being angled, the amount of bending of the spokes 24 can be reduced and/or eliminated.

The brake rotor attachment portion 38d is integrally formed with the center tubular portion 38c of the hub body 38 as a one-piece, unitary member. In the illustrated embodiment, the brake rotor attachment portion 38d is formed with six attachment members or points with through bores 70. While six individual attachment points are illustrated, it will be apparent to those skilled in the art from this disclosure that fewer or more attachment points can be utilized. Moreover, it will be apparent to those skilled in the art from this disclosure that the attachment portions could be a continuous flange, if needed and/or desired. The through bore 70 can be threaded (FIG. 7) or unthreaded (bores 70' of FIG. 8). By using through bores 70 instead of blind bores, the rear hub 22 can be easily manufactured at a relatively lower cost.

Figure 8:
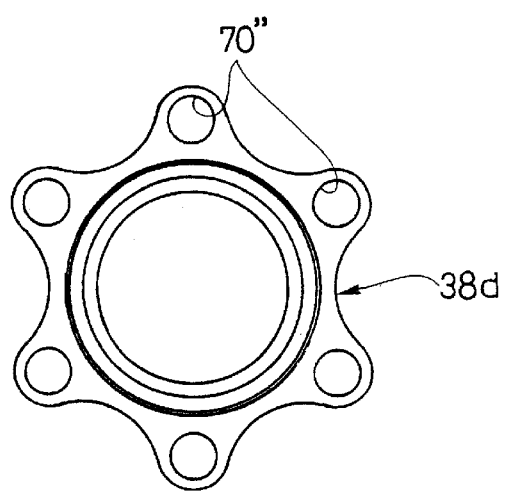
FIG. 8 is a left end elevational view of the rear brake disc hub body illustrated in FIGS. 4 and 5 with unthreaded bolt holes.
Figure 9:
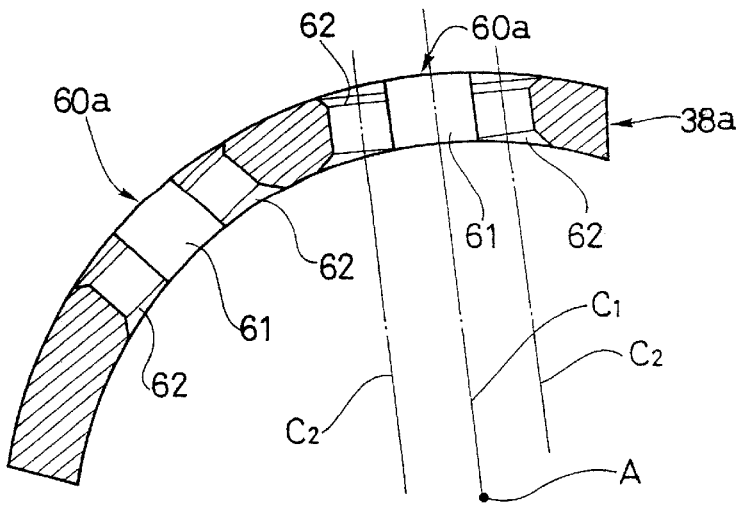
FIG. 9 is a partial transverse cross-sectional view of the rear brake disc hub body illustrated FIGS. 4 and 5 as seen along section line 9—9 of FIG. 4.
Figure 10:
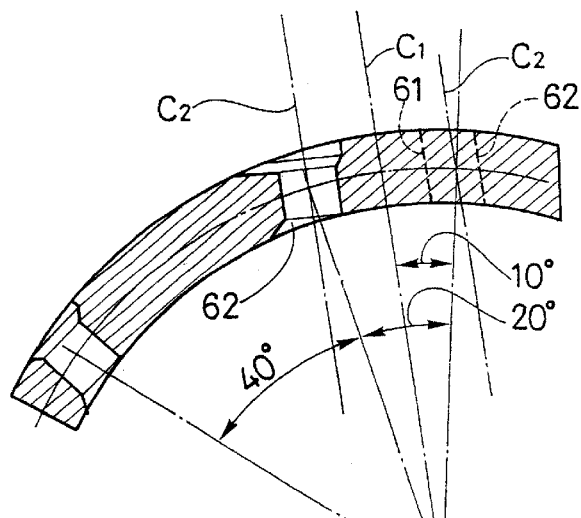
FIG. 10 is a partial transverse cross-sectional view of the rear brake disc hub body illustrated FIGS. 4 and 5 as seen along section line 10—10 of FIG. 4.
Figure 11:
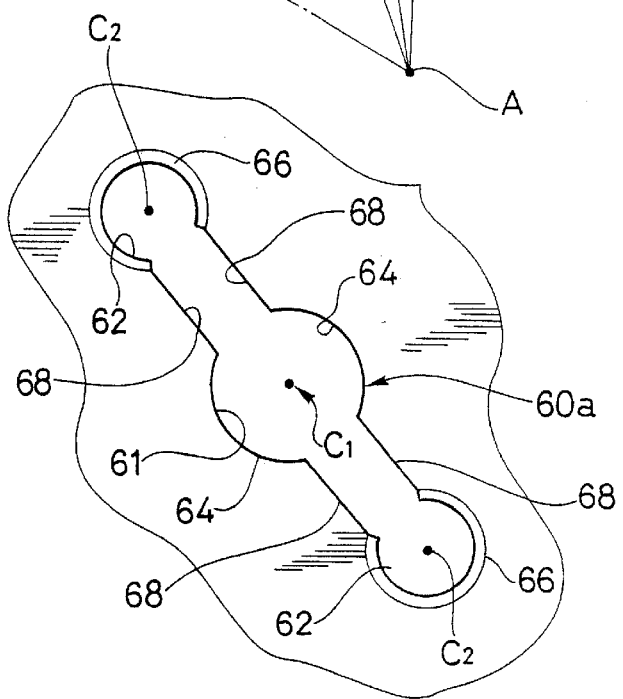
FIG. 11 is a partial elevational view of one of the spoke openings of the rear brake disc hub body illustrated in FIGS. 4 and 5.
Figure 12:
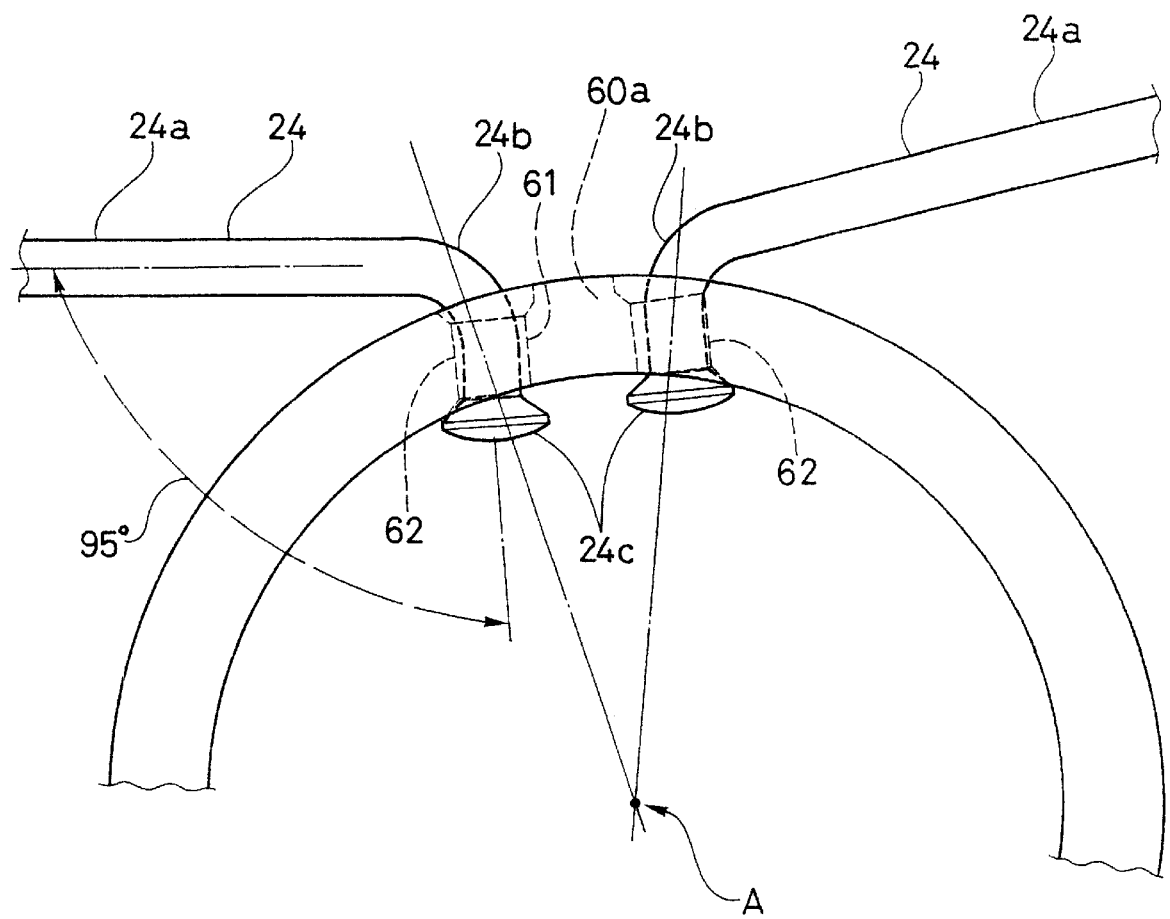
FIG. 12 is a schematic view of portion of the rear brake disc hub body illustrated in FIGS. 4 and 5 with two spokes extending outwardly therefrom.

As seen in FIG. 8, the through bores 70" can be unthreaded bores. In the case of unthreaded through bores 70", the bolts 32a extend into openings in the brake disc rotor 32 and then through the through bores 70". The free ends of the bolts 32a have nuts 32b threaded thereon for attaching the brake disc rotor 32 to the hub body 38. This arrangement allows the hub body 38 and the brake rotor attachment portion 38d to be formed out of the same a lightweight material, such as aluminum. In this arrangement, the hub body 38 does not need to be replaced if the through bores 70" become damaged.

Figure 7:
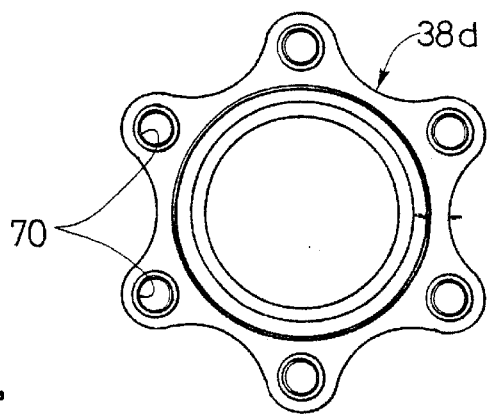
FIG. 7 is a left end elevational view of the rear brake disc hub body illustrated in FIGS. 4 and 5 with the brake disc rotor bolts removed.

As seen in FIG. 7, the through bores 70 are threaded. In the case of threaded through bores 70, the bolts 32a extend into openings in the brake disc rotor 32 and then threaded into the through bores 70. Optionally, the free ends of the bolts 32a can have the nuts 32b threaded thereon for more securely attaching the brake disc rotor 32 to the hub body 38. In this arrangement, if the threads of through bores 70 become damaged, the hub body 38 does not need to be replaced. Rather, the bolts 32a and the nuts 32b securely attach the brake disc rotor 32 to the hub body 38.

Bearing assemblies 40a and 40b rotatably supports hub body 38 on hub axle 36. The bearing assembly 40a basically includes a plurality of balls 74a located between an inner race member 76a and an outer race member 78a. Similarly, the bearing assembly 40b basically includes a plurality of balls 74b located between an inner race member 76b and an outer race member 78b. Since bearing assemblies 40a and 40b are well known in the bicycle art, they will not be discussed or illustrated in detail herein.

Figure 13:
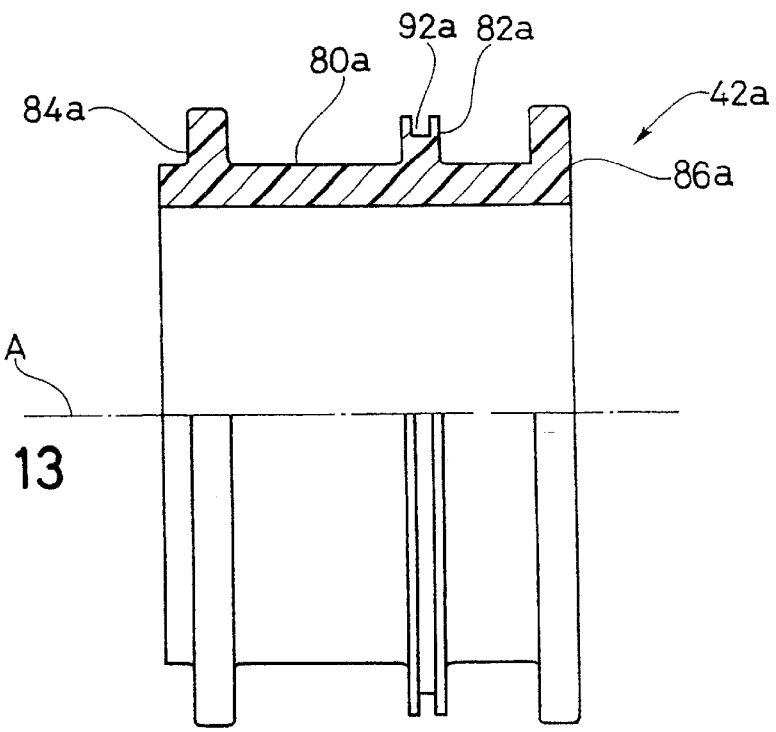
FIG. 13 is a partial cross-sectional view of the first seal for the rear brake disc hub body illustrated in FIGS. 4 and 5.
Figure 14:
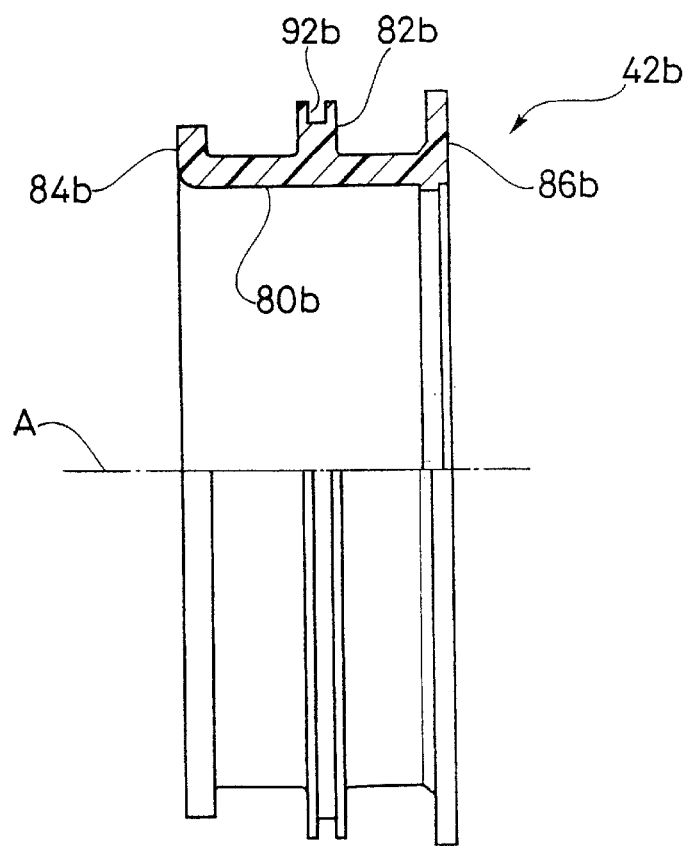
FIG. 14 is a partial cross-sectional view of the second seal for the rear brake disc hub body illustrated in FIGS. 4 and 5.

Turning now to FIGS. 13 and 14, the spoke seals 42a and 42b form a seal structure that is arranged in the interior passageway 52 of the hub body 38 so as to be adjacent the spoke openings 60a and 60b to isolate the spoke openings 60a and 60b from the hub axle 36. In other words, the spoke seals 42a and 42b prevent contaminants from entering the rear hub 22 through the spoke openings 60a and 60b. The spoke seals 42a and 42b are preferably resilient members that are constructed of rubber or the like. Of course, it will be apparent to those skilled in the art from this disclosure that the seals could be created from other types of materials, depending upon their shape and arrangement.

In the preferred embodiment, the spoke seals 42a and 42b also aid in the assembly of the spokes 24 with the hub body 38 and the rim 26. Specifically, in the preferred embodiments, the seals 42a and 42b are arranged so that they restrain movement of the spokes 24 within the spoke openings 60a and 60b so that the bent ends 24b of the spokes 24 stays in the retaining portions 62 of the spoke openings 60a and 60b.

In the illustrated embodiment, the spoke seal 42a has a tubular section 80a and a center annular flange 82a. The center annular flange 82a extends in a circumferential direction about the tubular section 80a. The center annular flange 82a can either contact the interior surface of the tubular section 80a or be spaced from the tubular section 80a. The ends 84a and 86a of the tubular section 80a are configured to engage a ring member 88a and an abutment 90a of the inner surface of the hub body 38. Of course, the particular shape of the ends 84a and 86a will vary depending on the shape of the hub body 38 and its internal components. Preferably, ends 84a and 86a of the tubular section 80a are annular flanges that contact the interior surface of the tubular section 80a to form an isolated area beneath the spoke openings 60a. This isolated area beneath the spoke openings 60a is a continuous annular space.

When the rear hub 22 is assembled, an axial force is applied to the ends 84a and 86a of the tubular section 80a to form annular seals therebetween. Thus, the ends 84a and 86a together with the tubular section 80a form a first sealing portion of the seal 42a. At least portion of the center flange 82a with the groove 92a extending from the tubular section 80a forms a first maintaining portion of the seal 42a. Accordingly, the spoke seal 42a isolates a first interior section of the interior passageway 52 from the reminder of the interior passageway 52. This interior section formed by the spoke seal 42a is continuous annular first space located beneath the spoke openings 60a.

When the rear hub 22 is assembled, an axial force is applied to the ends 84b and 86b of the tubular section 80b to form annular seals therebetween. Thus, the ends 84b and 86b together with the tubular section 80b form a second sealing portion of the seal 42b. At least portion of the center flange 82b with the groove 92b extending from the tubular section 80b forms a second maintaining portion of the seal 42b. Accordingly, the spoke seal 42b isolates a second interior section of the interior passageway 52 from the reminder of the interior passageway 52. This interior section formed by the spoke seal 42b is continuous annular second space located beneath the spoke openings 60b.

The center annular flange 82a is preferably aligned with a circumferentially passing through the center axes $C_1$ of the insertion portion 61 of the first spoke openings 60a. Thus, the center annular flange 82a is positioned to axially separate the two retaining portions 62 of each of the first spoke openings 60a from each other. The center annular flange 82a is also positioned to keep spokes 24 in the retaining portions 62 of the first spoke openings 60a. Accordingly, when the enlarged heads 24c of the spokes 24 are inserted into the insertion portions 61 of the spoke openings 60a, the enlarged heads 24c of the spokes 24 contact the center annular flange 82a. The enlarged heads 24c then pushes or deforms the center annular flange 82a one way or the other so that the enlarged heads 24c extends into the insertion portions 61 of the spoke openings 60a. The spokes 24 are then moved or slid into one of the two retaining portions 62 of each of the spoke openings 60a. The center annular flange 82a will prevent the spokes 24 from accidentally falling out of the insertion portions 61 of the spoke openings 60a. Thus, the center annular flange 82a aids in the assembly of the rear wheel 14. In other words, the center annular flange 82a must be moved or deformed again before the spokes 24 can be removed from the spoke openings 60a For added resiliency, an annular groove 92a can be formed in the outer peripheral surface of the center flange 82a.

Similar to the spoke seal 42a, the spoke seal 42b has a tubular section 80b and a center annular flange 82b. The center annular flange 82a extends in a circumferential direction about the tubular section 80a. Alternatively, the center annular flanges 82a and 82b of the spoke seals 42a and 42b can each have a pair of center annular flanges. The ends 84b and 86b of the tubular section 80b are configured to engage a ring member 88b and an abutment 90b of the inner surface of the hub body 38. Of course, the particular shape of the ends 84b and 86b will vary depending on the shape of the hub body 38 and its internal components. Preferably, ends 84b and 86b of the tubular section 80b are annular flanges that contact the interior surface of the tubular section 80b to form an isolated area beneath the spoke openings 60b. This isolated area beneath the spoke openings 60b is a continuous annular space.

When the rear hub 22 is assembled, an axial force is applied to the ends 84b and 86b of the tubular section 80b to form annular seals therebetween. Accordingly, the spoke seal 42b isolates a second interior section of the interior passageway 52 from the reminder of the interior passageway 52. This interior section formed by the spoke seal 42b is continuous annular second space located beneath the spoke openings 60b.

Similar to the center annular flange 82a, the center annular flange 82b is preferably aligned with a circumferentially passing through the centers axes $C_1$ of the insertion portions 61 of the second spoke openings 60b. Thus, the center annular flange 82b is positioned to axially separate the two retaining portions 62 of each of the second spoke openings 60b from each other. The center annular flange 82b is also positioned to keep spokes 24 in the retaining portions 62 of the second spoke openings 60b. Accordingly, when the enlarged heads 24c of the spokes 24 are inserted into the insertion portions 61 of the spoke openings 60b, the enlarged heads 24c of the spokes 24 contact the center annular flange 82b. The enlarged heads 24c then pushes or deforms the center annular flange 82b one way or the other so that the enlarged heads 24c extends into the insertion portions 61 of the spoke openings 60b. The spokes 24 are then moved or slid into one of the two retaining portions 62 of each of the spoke openings 60b. The center annular flange 82b will prevent the spokes 24 from accidentally falling out of the insertion portions 61 of the spoke openings 60b. Thus, the center annular flange 82b aids in the assembly of the rear wheel 14. In other words, the center annular flange 82b must be moved or deformed again before the spokes 24 can be removed from the spoke openings 60b. For added resiliency, an annular groove 92b can be formed in the outer peripheral surface of the center flange 82b.

The freewheels, such as the freewheel 44, are well known in the bicycle art, and thus, the freewheel 44 will not be illustrated or discussed in detail herein. The freewheel 44 is used to transmit a driving force from the chain to the rear bicycle wheel in one rotation direction only. The freewheel 44 allows the bicycle 10 to advance freely without any rotation of the pedals. The freewheel 44 is fastened to the rear hub 22 as integral part of the rear hub 22 in a conventional manner. The freewheel 44 has an outer tubular part 94, an inner tubular part 96 and a one-way clutch 98. The inner tubular part 96 is installed radially inwardly of the outer tubular part 94 so that the inner tubular part 96 is free to rotate relative to the outer tubular part 94. The one-way clutch 98 is installed between the outer tubular part 94 and inner tubular part 96 for transmitting the driving force from the outer tubular part 94 to the inner tubular part 96 in one rotational direction only. The outer tubular part 94 has a plurality of gears or sprockets (not shown) mounted thereon, while the inner tubular part 96 is usually mounted on the hub axle 36.

FRONT HUB 22'

Figure 15:
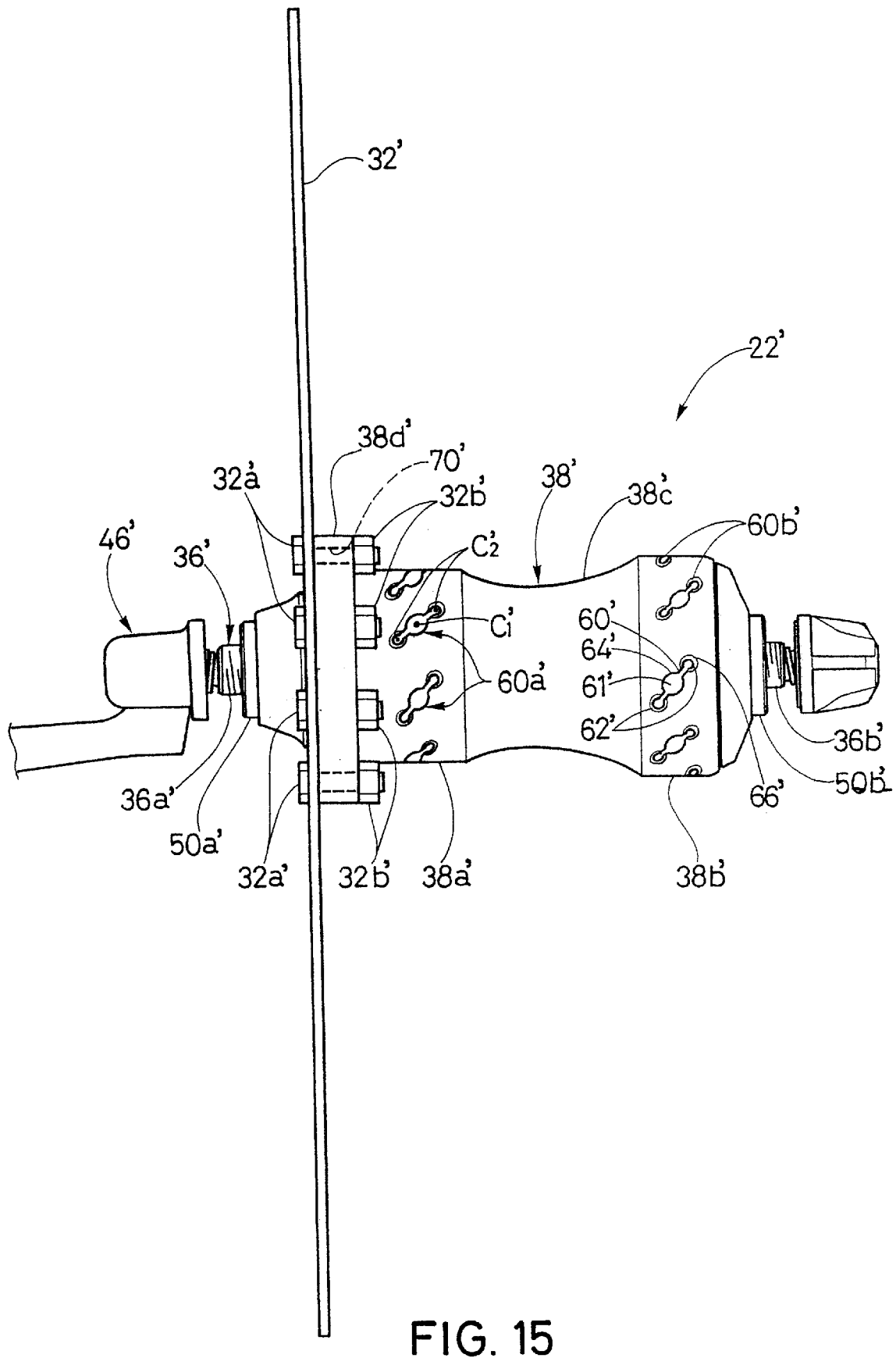
FIG. 15 is a side elevational view of the front brake disc hub of the front wheel illustrate FIG. 1.
Figure 16:
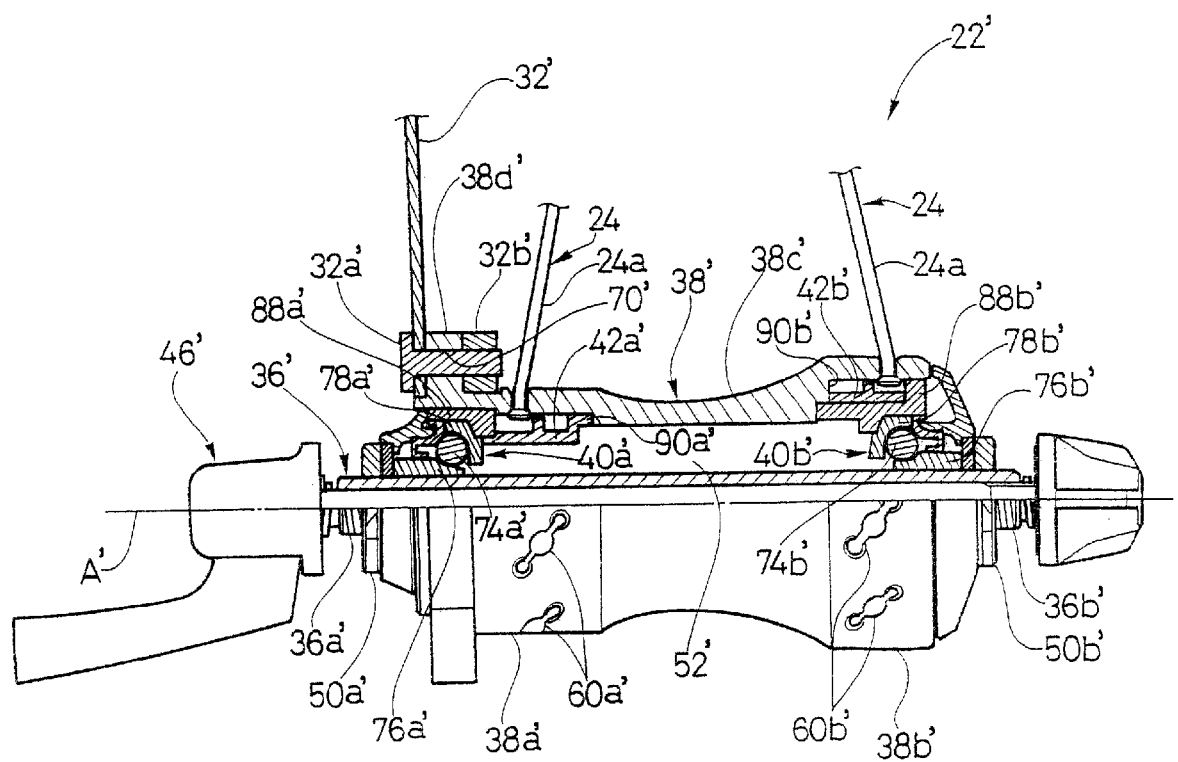
FIG. 16 is a side elevational view of the front brake disc hub of the front wheel illustrated in FIG. 1 with certain portions broken away for purposes of illustration.

Turning now to FIGS. 15 and 16, the front hub 22' is illustrated in accordance with the present invention. The front hub 22' is substantially the same as the rear hub 22, except that the front hub 22' does not have a freewheel and the spoke openings 60a' and 60b' are angled in the opposite direction from spoke openings 60a and 60b of the rear hub 22. Moreover, the front hub 22' is used with spokes 24 and rim 26 discussed above. Since the front hub 22' is substantially the same as the rear hub 22, the front hub 22' will not be discussed or illustrated in detail herein.

The front hub 22' basically includes a hub axle 36', a hub body or shell 38', a first bearing assembly 40a', a second bearing assembly 40b', a first spoke seal 42a', a second spoke seal 42b' and a quick release mechanism 46'. Of the parts of front hub 22', only the hub body 38' and the first and second spoke seals 42a' and 42b' are non-conventional parts. The remaining parts of front hub 22' are relatively conventional, and thus, the remaining parts of front hub 22' will not be discussed or illustrated in detail herein.

The hub axle 36' has a center axis A extending between a first end 36a' and a second end 36b'. The quick release mechanism 46' extends through a center bore 36c' of the hub axle 36' such that the quick release mechanism 46' is coupled to the hub axle 36' in a conventional manner. The first and second ends 36a' and 36b' of the hub axle 36' are threaded for receiving a pair of nuts 50a' and 50b' that applies an axial force on the hub body 38', the bearing assemblies 40a' and 40b' and the spoke seals 42a' and 42b'. First and second bearing assemblies 40a' and 40b' rotatably mount the hub body 38' on the hub axle 36'.

The hub body 38' is illustrated in accordance with one embodiment of the present invention. In this embodiment, the hub body 38' is a hollow member that defines an interior passageway 52' with the hub axle 36' being rotatably supported therein by the first and second bearing assemblies 40a' and 40b'. Thus, the hub body 38' is a substantially tubular member. Specifically, the hub body 38' has a center tubular portion 38c' with first and second end sections 38a' and 38b' being integral formed with the center tubular portion 38c' as a one-piece, unitary member. The first end section 38*a*' has an integrally mounted brake rotor attachment portion 38*d*'.

A set of first spoke openings 60*a*' are provided at the first end section 38*a*' of the hub body 38' for receiving the bent ends 24*b* of the spokes 24. Similarly, the second end section 38*b*' of the hub body 38' is provided with a second set of spoke openings 60*b*' for receiving the bent ends 24*b* of the spokes 24. In the illustrated embodiment, the first end section 38*a*' is provided with nine of the first spoke openings 60*a*' and the second end section 38*b*' is provided with nine of the second spoke openings 60*b*'. The spoke openings 60*a*' and 60*b*' are equally spaced apart about the circumference of the hub body 38'. Each of the spoke openings 60*a*' and 60*b*' are also designed to receive two spokes 24 as explained below. Accordingly, the front hub 22' is designed to have thirty-six spokes extending outwardly therefrom in a generally tangential direction.

Preferably, the first and second sets of spoke openings 60*a*' and 60*b*' are identical. The first and second spoke openings 60*a*' and 60*b*' are designed to be used with conventional tangential spokes 24. Of course, it is possible that the first and second sets of spoke openings 60*a*' and 60*b*' can be different such that tangential spokes 24 are used in one end of the hub body 38' and a different types of spokes are used in the other end of the hub body 38'. The first spoke openings 60*a*' are circumferentially arranged around the hub body 38' adjacent to the brake rotor attachment portion 38*d*'. Preferably, the first spoke openings 60*a*' are spaced axially inward of the brake rotor attachment portion 38*d*' so that brake disc rotor 32' can be easily attached with the bolts 32*a*' and nuts 32*b*'.

In this embodiment, the first and second spoke openings 60*a*' and 60*b*' are elongated slots that are each provided with an insertion portion 61' and a pair of retaining portions 62'. Accordingly, each of the spoke openings 60*a*' and 60*b*' is designed to have a pair of spokes 24 retained therein with the spokes 24 extending in opposite directions.

The insertion portion 61' of each spoke opening is located between the pair of retaining portions 62' of each spoke opening. Each insertion portion 61' is formed by a pair of opposed curved surfaces 64' that are spaced apart so as to be equal to or slightly larger than the widths or diameters of the enlarged heads 24*c* of the spokes 24. Thus, the inner ends (bent ends 24*b* with enlarged heads 24*c*) of the spokes 24 can be easily inserted into the spoke openings 60*a*' and 60*b*' through the insertion portions 61'.

The retaining portions 62' have smaller widths or diameters than the insertion portions 61'. More specifically, the diameters or widths of the retaining portions 62' are smaller than the diameters or widths of the enlarged heads 24*c* of the spokes 24 so as to retain the spokes 24 within the spoke openings 60*a*' and 60*b*'. The retaining portions 62' are each preferably defined by a partial cylindrical surface 66' that is connected to the curved surfaces 64' of the associated insertion portion 61' by a pair of straight surfaces 68'.

The spoke openings 60*a*' and 60*b*' are formed elongated slots that are angled relative to the axis A'. Accordingly, the insertion portions 61' are arranged in a circumferential pattern with one set of the retaining portions 62' being located axially outward from the insertion portions 61' and the other set of retaining portions 62' being spaced axially inward from the insertion portions 61'. In other words, a first set of retaining portions 62' form an outer circumferential row of the retaining portions 62', and a second set of the retaining portions 62' form an inner circumferential row of retaining portions 62' with the insertion portions 61' being located between the rows of retaining portions 62'.

Preferably, the insertion portion 61' and the retaining portions 62' of each spoke opening are formed simultaneously. Also preferably, the inner and outer ends of the retaining portions 62' of the spoke openings 60*a*' and 60*b*' are tapered to avoid sharp edges engaging the spokes 24.

Each of the insertion portions 61' has a center longitudinal axis $C_1$' that passes through the center axis A' of the hub axle 36'. The retaining portions 62', on the other hand, have center longitudinal axes $C_2$' that are parallel to the center longitudinal axis $C_1$' of the insertion portion 61' for each of the spoke openings 60*a*' and 60*b*'. Thus, the center longitudinal axes $C_2$' of the retaining portions 62' do not pass through the center axis of the hub axle 36'. Rather, the center longitudinal axes $C_2$' of the retaining portions 62' are angled with respect to center axis A'. Preferably, the center longitudinal axis $C_2$' of each retaining portion 62' is angled between about 5° and about 20° from a radial orientation in the hub body 38'. In the illustrated embodiment, the retaining portions 62' are angled about 10° with respect to center axis A for a twenty-six inch rim with thirty-six spoke holes and a hub having a diameter approximately 22 millimeters. For a twenty-six inch rim with thirty-two spoke holes and a hub having a diameter approximately 22 millimeters, the retaining portions 62' are preferably angled about 11° with respect to center axis A'. This angled configuration of the retaining portions 62' results in the straight sections 24*a* of the spokes 24 being easily arranged in a tangential direction relative to an imaginary circle centered on the hub body 38'. Moreover, this angled configuration of the retaining portions 62' allows the straight sections 24*a* of the spokes 24 to be easily aligned with the spoke holes 34 of the rim 26 without significant bending of the spokes 24. In the illustrated embodiment, the spokes 24 are not bent more than about five degrees.

If the retaining portions 62' were formed with their center axis passing through the center axis A of the hub axle 36', then the conventional spokes 24 would be placed under excessive bending forces, which could result in the spokes 24 breaking during use of the wheel. In particular, if the retaining portions 62' have their center axes passing through the center of the hub axle 36', then the center straight section 24*a* would have to be bent from 95° to 108° for a twenty-six inch rim with thirty-six spoke holes and a hub having a diameter approximately 22 millimeters. In contrast, with the retaining portions 62' of the spokes 24 being angled, the amount of bending of the spokes 24 can be reduced and/or eliminated.

The brake rotor attachment portion 38*d*' is integrally formed with the center tubular portion 38*c*' of the hub body 38' as a one-piece, unitary member. In the illustrated embodiment, the brake rotor attachment portion 38*d*' is formed with six attachment members or points with through bores 70'. While six individual attachment points are illustrated, it will be apparent to those skilled in the art from this disclosure that fewer or more attachment points can be utilized. Moreover, it will be apparent to those skilled in the art from this disclosure that the attachment portions could be a continuous flange, if needed and/or desired. The through bore 70' can be threaded or unthreaded. By using through bores 70' instead of blind bores, the front hub 22' can be easily manufactured at a relatively lower cost.

In the case of unthreaded through bores 70', the bolts 32*a*' extend into openings in the brake disc rotor 32' and then through the through bores 70'. The free ends of the bolts 32*a*' have nuts 32*b*' threaded thereon for attaching the brake disc rotor 32' to the hub body 38'. This arrangement allows the hub body 38' and the brake rotor attachment portion 38*d*' to be formed out of the same a lightweight material, such as aluminum. Moreover, the hub body 38' does not need to be replaced if the through bores 70' become damaged.

In the case of threaded through bores 70', the bolts 32a' extend into openings in the brake disc rotor 32' and then threaded into the through bores 70'. Optionally, the free ends of the bolts 32a' can have the nuts 32b' threaded thereon for more securely attaching the brake disc rotor 32' to the hub body 38'. In this arrangement, if the threads of through bores 70' become damaged, the hub body 38' does not need to be replaced. Rather, the bolts 32a' and the nuts 32b' securely attach the brake disc rotor 32' to the hub body 38'.

Bearing assemblies 40a' and 40b' rotatably supports hub body 38' on hub axle 36'. The bearing assembly 40a' basically includes a plurality of balls 74a' located between an inner race member 76a' and an outer race member 78a'. Similarly, the bearing assembly 40b' basically includes a plurality of balls 74b' located between an inner race member 76b' and an outer race member 78b'. Since bearing assemblies 40a' and 40b' are well know in the bicycle art, they will not be discussed or illustrated in detail herein.

Figure 17:
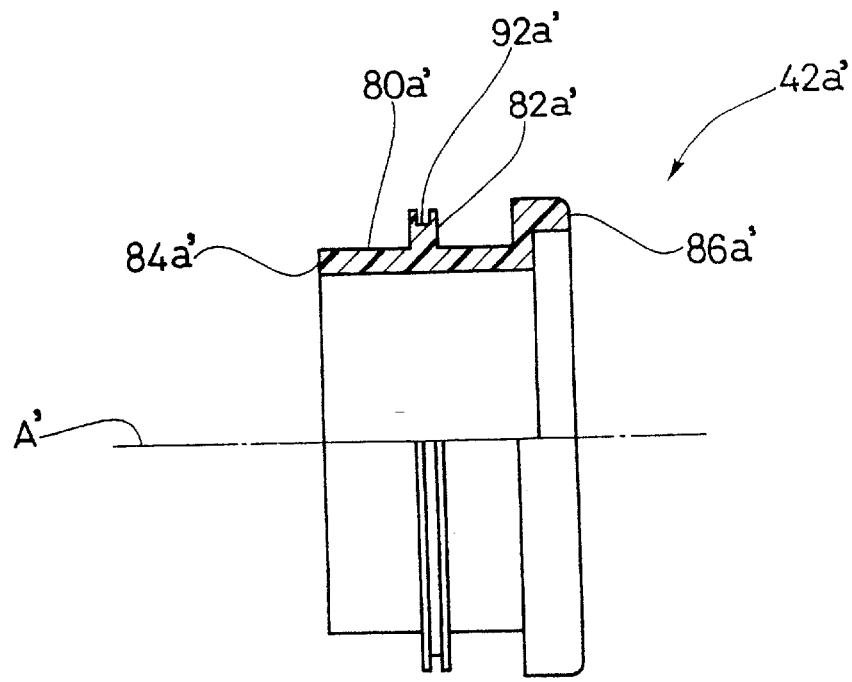
FIG. 17 is a partial cross-sectional view of the first seal for the front brake disc hub body illustrated in FIGS. 15 and 16.
Figure 18:
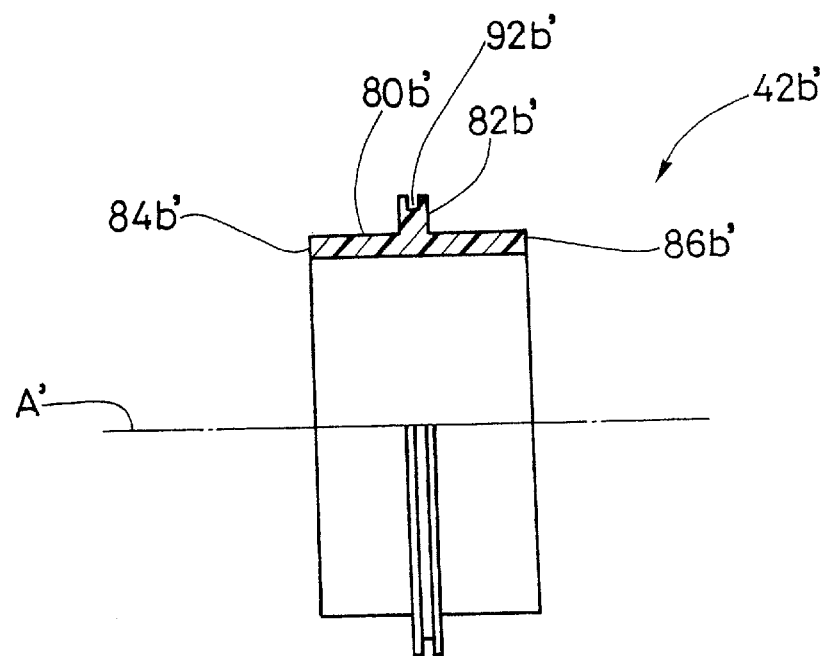
FIG. 18 is a partial cross-sectional view of the second seal for the front brake disc hub body illustrated in FIGS. 15 and 16.

Turning now to FIGS. 17 and 18,the spoke seals 42a' and 42b' are arranged in the interior passageway 52' of the hub body 38' so as to be adjacent the spoke openings 60a' and 60b' to isolate the spoke openings 60a' and 60b' from the hub axle 36. In other words, the spoke seals 42a' and 42b' prevent contaminants from entering the front hub 22' through the spoke openings 60a' and 60b'. The spoke seals 42a' and 42b' are preferably resilient members that are constructed of rubber or the like. Of course, it will be apparent to those skilled in the art from this disclosure that the seals could be created from other types of materials, depending upon their shape and arrangement. Moreover, it will be apparent to those skilled in the art from this disclosure that while the spoke seals 42a' and 42b' are illustrated as a pair of separate sealing members, the spoke seals 42a' and 42b' can be formed as a one-piece, unitary member.

In the preferred embodiment, the spoke seals 42a' and 42b' also aid in the assembly of the spokes 24 with the hub body 38' and the rim 26. Specifically, in the preferred embodiments, the seals 42a' and 42b' are arranged so that they restrain movement of the spokes 24 within the spoke openings 60a' and 60b' so that the bent ends 24b of the spokes 24 stays in the retaining portions 62' of the spoke openings 60a' and 60b'.

In the illustrated embodiment, the spoke seal 42a' has a tubular section 80a' and a center annular flange 82a'. The center annular flange 82a' extends in a circumferential direction about the tubular section 80a'. The ends 84a' and 86a' of the tubular section 80a' are configured to engage a ring member 88a' and an abutment 90a' of the inner surface of the hub body 38'. Of course, the particular shape of the ends 84a' and 86a' will vary depending on the shape of the hub body 38' and its internal components. In other words, the spoke seal 42a' functions the same way as the spoke seal 42a of the rear hub 22, but has a slightly modified ends 84a' and 86a' to accommodate front hub 22'.

When the front hub 22' is assembled, an axial force is applied to the ends 84a' and 86a' of the tubular section 80a' to form annular seals therebetween. Accordingly, the spoke seal 42a' isolates a first interior section of the interior passageway 52' from the reminder of the interior passageway 52'. This interior section formed by the spoke seal 42a' is continuous annular first space located beneath the spoke openings 60a'.

The center annular flange 82a' is preferably aligned with a circumferentially passing through the centers axes $C_1$' of the insertion portions 61' of the first spoke openings 60a'. Thus, the center annular flange 82a' is positioned to axially separate the two retaining portions 62' of each of the first spoke openings 60a' from each other. The center annular flange 82a' is also positioned to keep spokes 24 in the retaining portions 62' of the first spoke openings 60a'. Accordingly, when the enlarged heads 24c of the spokes 24 are inserted into the insertion portions 61 of the spoke openings 60a', the enlarged heads 24c of the spokes 24 contact the center annular flange 82a'. The enlarged heads 24c then pushes or deforms the center annular flange 82a' one way or the other so that the enlarged heads 24c extends into the insertion portions 61' of the spoke openings 60a'. The spokes 24 are then moved or slid into one of the two retaining portions 62' of each of the spoke openings 60a. The center annular flange 82a' will prevent the spokes 24 from accidentally falling out of the insertion portions 61' of the spoke openings 60a'. Thus, the center annular flange 82a' aids in the assembly of the front wheel 16. In other words, the center annular flange 82a' must be moved or deformed again before the spokes 24 can be removed from the spoke openings 60a'. For added resiliency, an annular groove 92a' can be formed in the outer peripheral surface of the center flange 82a'.

Similar to the spoke seal 42a', the spoke seal 42b' has a tubular section 80b' and a center annular flange 82b'. The center annular flange 82a' extends in a circumferential direction about the tubular section 80a'. Alternatively, the center annular flanges 82a' and 82b' of the spoke seals 42a' and 42b' can each have a pair of center annular flanges. The ends 84b' and 86b' of the tubular section 80b' are configured to engage a ring member 88b' and an abutment 90b' of the inner surface of the hub body 38'. Of course, the particular shape of the ends 84b' and 86b' will vary depending on the shape of the hub body 38' and its internal components. When the front hub 22' is assembled, an axial force is applied to the ends 84b' and 86b' of the tubular section 80b' to form annular seals therebetween. Accordingly, the spoke seal 42b' isolates a second interior section of the interior passageway 52' from the reminder of the interior passageway 52'. This interior section formed by the spoke seal 42b' is continuous annular second space located beneath the spoke openings 60b'.

Similar to the center annular flange 82a', the center annular flange 82b' is preferably aligned with a circumferentially passing through the centers axes $C_1$ of the insertion portions 61' of the second spoke openings 60b'. Thus, the center annular flange 82b' is positioned to axially separate the two retaining portions 62' of each of the second spoke openings 60b' from each other. The center annular flange 82b' is also positioned to keep spokes 24 in the retaining portions 62' of the second spoke openings 60b'. Accordingly, when the enlarged heads 24c of the spokes 24 are inserted into the insertion portions 61' of the spoke openings 60b', the enlarged heads 24c of the spokes 24 contact the center annular flange 82b'. The enlarged heads 24c then pushes or deforms the center annular flange 82b' one way or the other so that the enlarged heads 24c extends into the insertion portions 61' of the spoke openings 60b'. The spokes 24 are then moved or slid into one of the two retaining portions 62 of each of the spoke openings 60b'. The center annular flange 82b' will prevent the spokes 24 from accidentally falling out of the insertion portions 61' of the spoke openings 60b'. Thus, the center annular flange 82b' aids in the assembly of the front wheel 16. In other words, the center annular flange 82b' must be moved or deformed again before the spokes 24 can be removed from the spoke openings 60b'. For added resiliency, an annular groove 92b' can be formed in the outer peripheral surface of the center flange 82b'.

SPOKE OPENING COVERS

Figure 19:
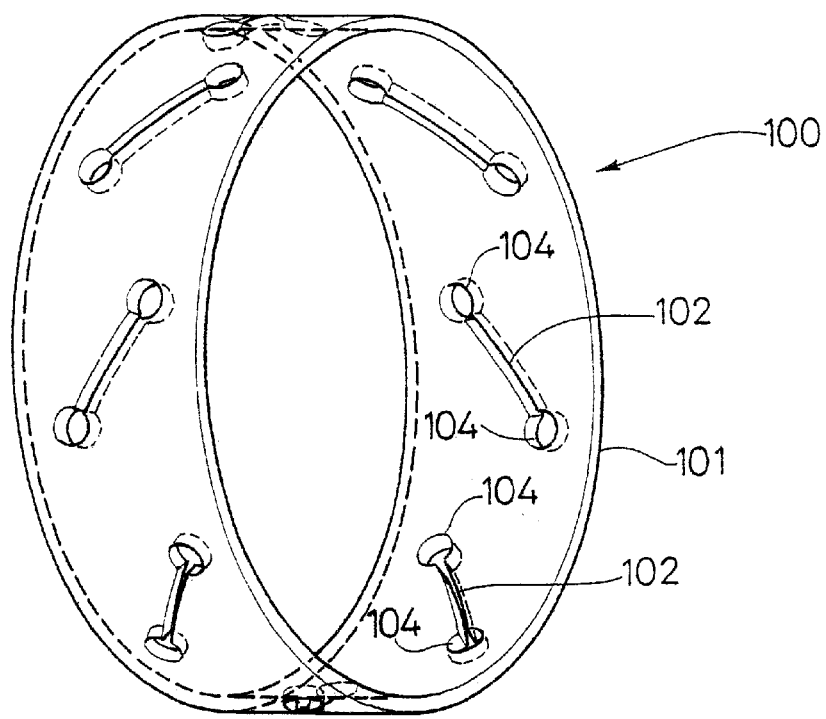
FIG. 19 is a perspective view of a first embodiment of a spoke opening cover for the h s of the present invention.
Figure 20:
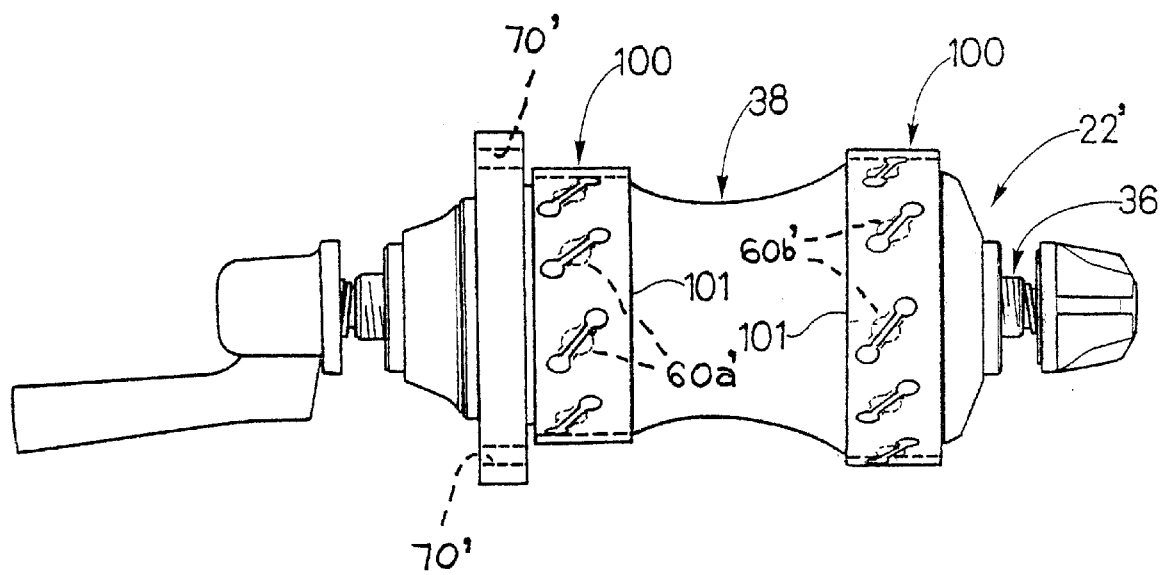
FIG. 20 is a side elevational view of the front brake disc hub with the spoke opening cover illustrated in FIG. 19 installed thereon.

As seen in FIGS. 19 and 20, a spoke opening cover 100 in accordance with one embodiment of the present invention is illustrated for use with the front hub 22' of FIGS. 15 and 16. Of course, the spoke opening cover 100 can be used with the rear hub 22 of FIGS. 4 and 5 by turning the spoke opening cover 100 inside out to reverse the direction of the slits 102. Although for purposes of brevity, the spoke opening cover 100 will only be illustrated with the front hub 22'.

The spoke opening cover 100 is used to limit or prevent contaminants from entering the hub body 38 or 38' via the spoke openings 60a, 60a' or 60b, 60b', respectively. The spoke opening cover 100 can be used instead of the spoke seals 42a, 42a' and 42b, 42b', or in conjunction with the spoke seals 42a, 42a' and 42b, 42b'. The spoke opening cover 100 basically has a resilient tubular body 101 constructed from a flexible material such as rubber. The spoke opening cover 100 has a plurality of slits 102 spaced circumferential around the tubular body 101. The tubular body 101 of the spoke opening cover 100 is configured and dimensioned to snugly fit around the bicycle hub 22' so that the spoke openings are aligned with the slits. The spoke opening cover 100 is installed on each end of the hub body 38' prior to installation of spokes 24. Since this embodiment is used with the bicycle hubs 22 and 22', the slits 102 extend diagonally relative a center axis of the tubular body. The slits 102 have enlarged openings 104 at each end. The enlarged openings 104 align with the retaining portions 62' of the spoke openings 60a' or 60b', while the center sections of the slits 102 overlie the insertion portions 61' of the spoke openings 60a' or 60b'. Also, the center sections of the slits 102 hold the spokes 24 in the retaining portions 62' to aid in the assembly of the wheel.

Figure 4:
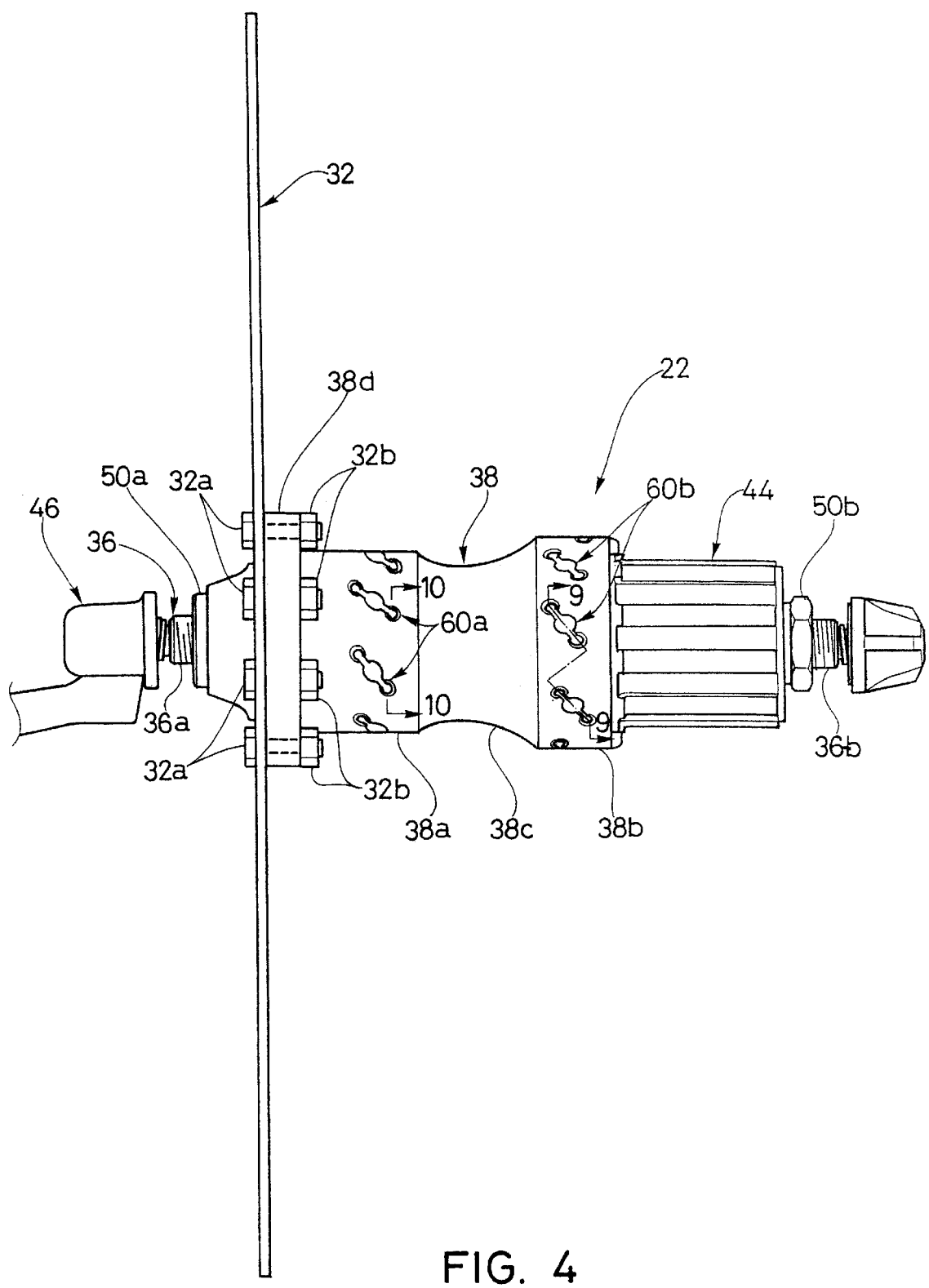
FIG. 4 is a side elevational view of the rear brake disc hub of the rear wheel illustrated in FIG. 2 with the sprockets removed.
Figure 21:
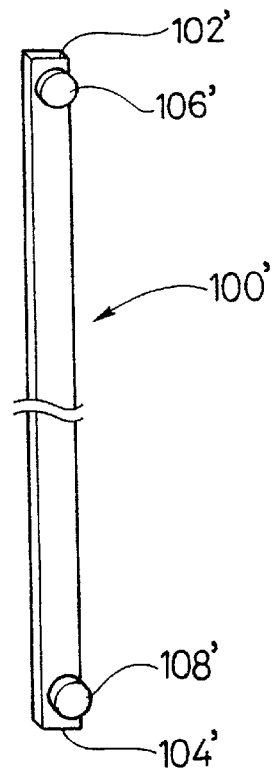
FIG. 21 is a perspective view of a second embodiment of a spoke opening cover for the hubs of the present invention.
Figure 22:
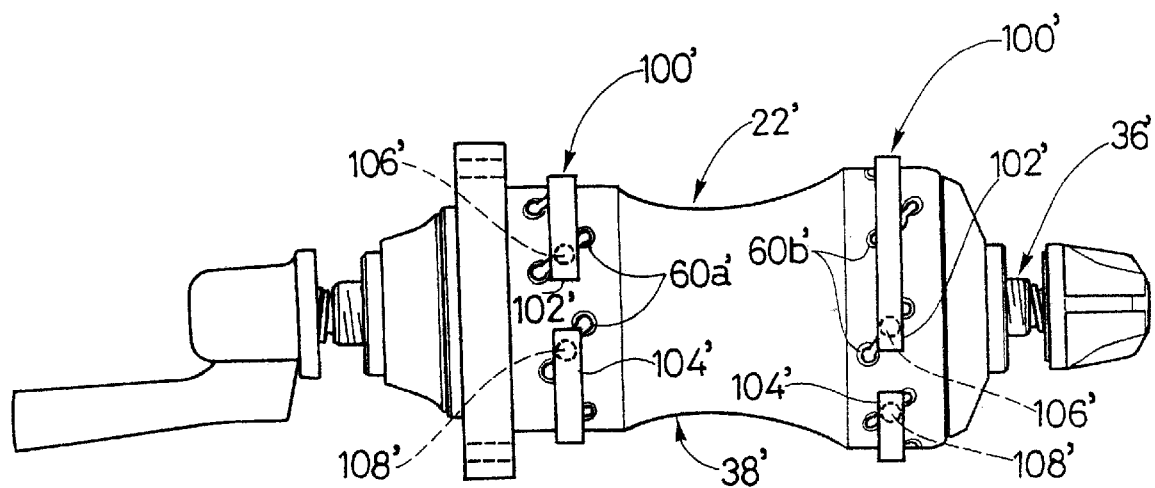
FIG. 22 is a side elevational view of the front brake disc hub with the spoke opening cover illustrated in FIG. 21 installed thereon.

As seen in FIGS. 21 and 22, a spoke opening cover 100' in accordance with an alternate embodiment of the present invention is illustrated for use with the bicycle either the rear hub 22 of FIGS. 4 and 5 or the front hub 22' of FIGS. 15 and 16. Although for purposes of brevity, the spoke opening cover 100' will only be illustrated with the front hub 22'.

The spoke opening cover 100' is used to limit or prevent contaminants from entering the hub body 38 or 38' via the spoke openings 60a, 60a' or 60b, 60b', respectively. The spoke opening cover 100' can be used instead of the spoke seals 42a, 42a' and 42b, 42b', or in conjunction with the spoke seals 42a, 42a' and 42b, 42b'. In this embodiment, the spoke opening cover 100' is a thin flexible strip or body portion 101' having a first end 102' and a second end 104' with a predetermined length therebetween. The first end 102' is provided with a first protrusion 106', while the second end 104' is provided with a second protrusion 108'. The first and second protrusions 106' and 108' are configured and dimensioned to be frictionally retained with the insertion portions 61' of the spoke openings 60a' or 60b'. Accordingly, the first and second protrusions 106' and 108' have predetermined widths or diameters that are larger that a width of an enlarged head 24c of a spoke 24. Preferably, the body portion 101' has a predetermined width that is larger that the widths or diameters of the enlarged heads 24c of the spokes 24. In other words, the body portion 101' of the spoke opening cover 100' has a predetermined width that is larger than a width of insertion portions 61' of the spoke openings 60a' or 60b'. The spoke opening cover 100' is designed to be installed on each end of the hub body 38' after the spokes 24 have been installed into the spoke openings 60a' and 60b'.

Figures 23, 24:
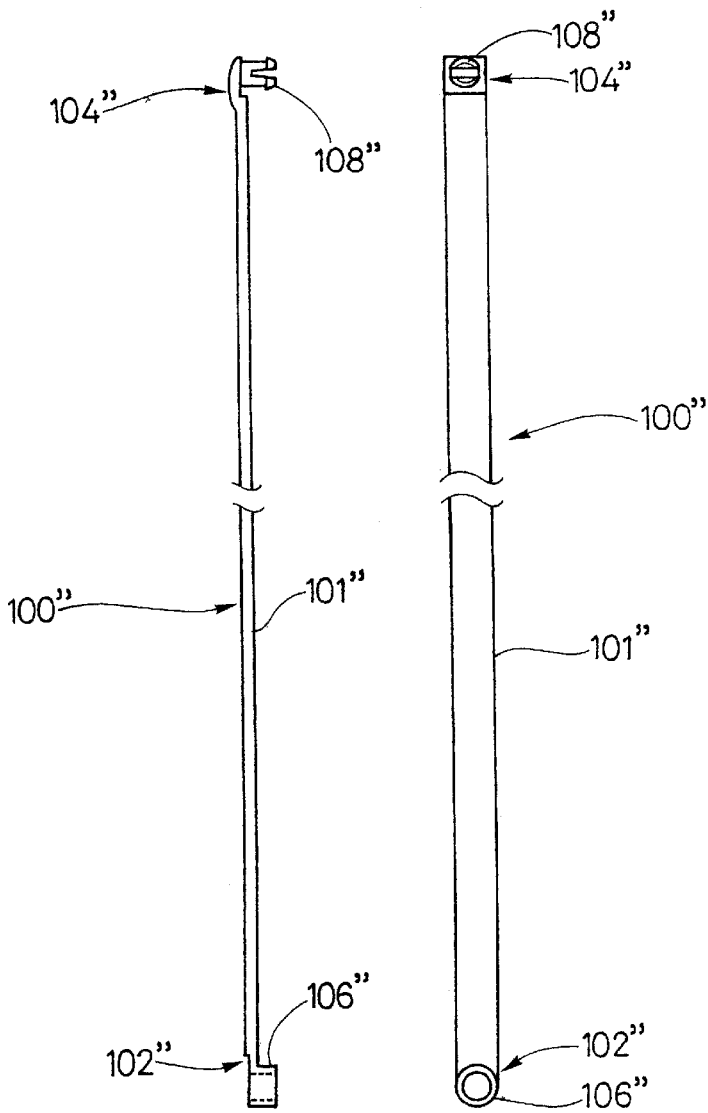
FIG. 23 is an inside elevational view of a third embodiment of a spoke opening cover fore hubs of the present invention.
FIG. 24 is an edge elevational view of the spoke opening cover illustrated in FIG. 23 for the hubs of the present invention.
Figure 25:
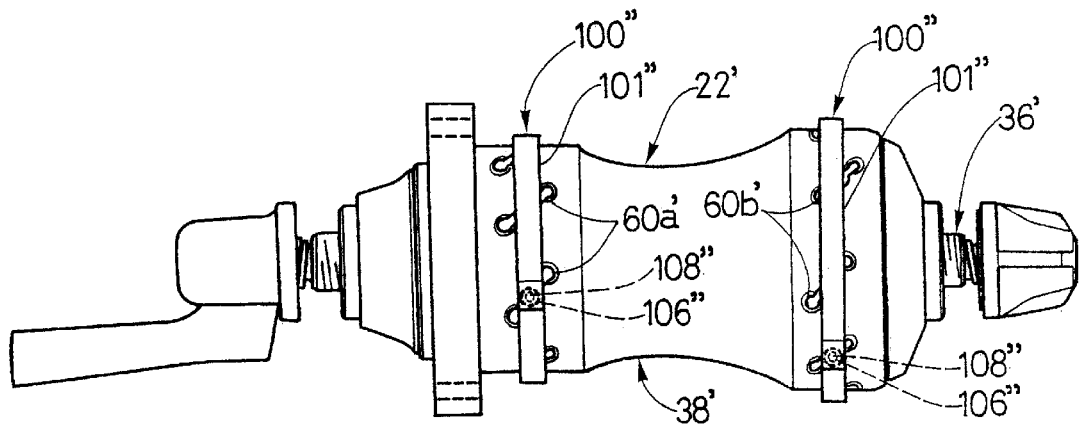
FIG. 25 is a side elevational view of the front brake disc hub with the spoke opening cover illustrated in FIGS. 23 and 24 installed thereon.

As seen in FIGS. 23–25, a spoke opening cover 100" in accordance with another alternate embodiment of the present invention is illustrated for use with the bicycle either the rear hub 22 of FIGS. 4 and 5 or the front hub 22' of FIGS. 15 and 16. Although for purposes of brevity, the spoke opening cover 100" will only be illustrated with the front hub 22'.

The spoke opening cover 100" is used to limit or prevent contaminants from entering the hub body 38 or 38' via the spoke openings 60a, 60a' or 60b, 60b', respectively. The spoke opening cover 100" can be used instead of the spoke seals 42a, 42a' and 42b, 42b', or in conjunction with the spoke seals 42a, 42a' and 42b, 42b'. In this embodiment, the spoke opening cover 100" is a thin flexible strip or body portion 101" having a first end 102" and a second end 104" with a predetermined length therebetween.

The first end 102" is provided with a tubular connector 106", while the second end 104" is provided with a mating connector 108". The tubular connector 106" is a protrusion that is configured and dimensioned to be received in one of the insertion portions 61' of the spoke openings 60a' or 60b'. The mating connector 108' is a split protrusion in the form of a resilient detent. The second end 104" is configured and dimensioned to overlap the first end 102" with mating connector 108" being retained in the bore of tubular protrusion 106" via a snap-fit. The length of body portion 101"should be such that spoke opening cover 100" snugly fits around the hub body 38' when the detent 108" is snap-fitted into the tubular protrusion 106".

Preferably, the body portion 101" has a predetermined width that is larger than the widths or diameters of the enlarged heads 24c of the spokes 24. In other words, the body portion 101" of the spoke opening cover 100" has a predetermined width that is larger than a width of insertion portions 61' of the spoke openings 60a' or 60b'. The spoke opening cover 100" is designed to be installed on each end of the hub body 38' after the spokes 24 have been installed into the spoke openings 60a' and 60b'.

Second Embodiment

Referring now to FIGS. 26–29, bicycle rear and front hubs 122 and 122' are illustrated in accordance with a second embodiment of the present invention. The rear and front hubs 122 and 122' of this second embodiment are substantially the same as the first embodiment, except that the spoke hole openings 60a, 60a' and 60b, 60b' of the first embodiment have been replaced with modified spoke openings 160a, 160a' and 160b, 160b' that each receive a single spoke as explained below. Since the rear and front hubs 122 and 122' are substantially the same as the rear and front hubs 22 and 22' of the first embodiment, this embodiment will not be discussed or illustrated in detail herein.

Figure 26:
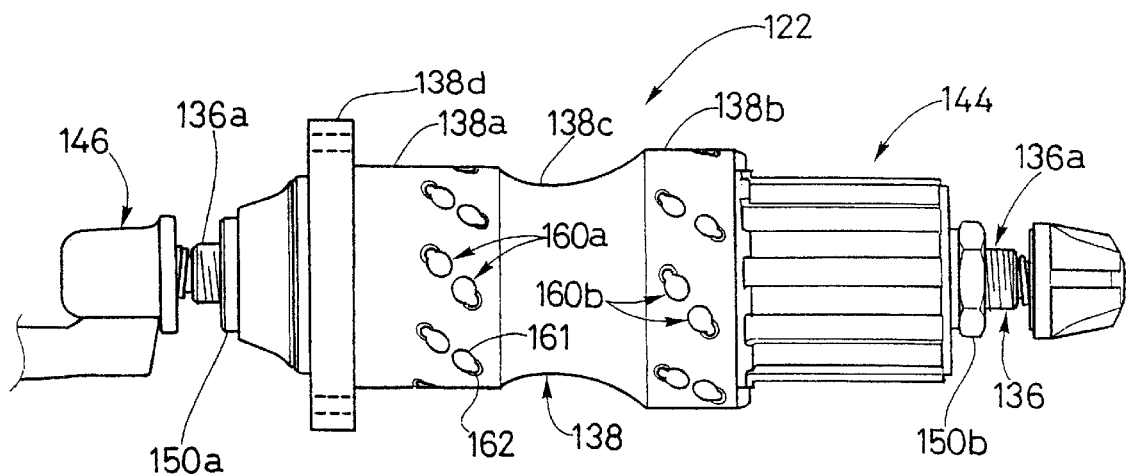
FIG. 26 is a side elevational view of the rear brake disc hub in accordance with a second embodiment of the present invention with the sprockets removed.
Figure 27:
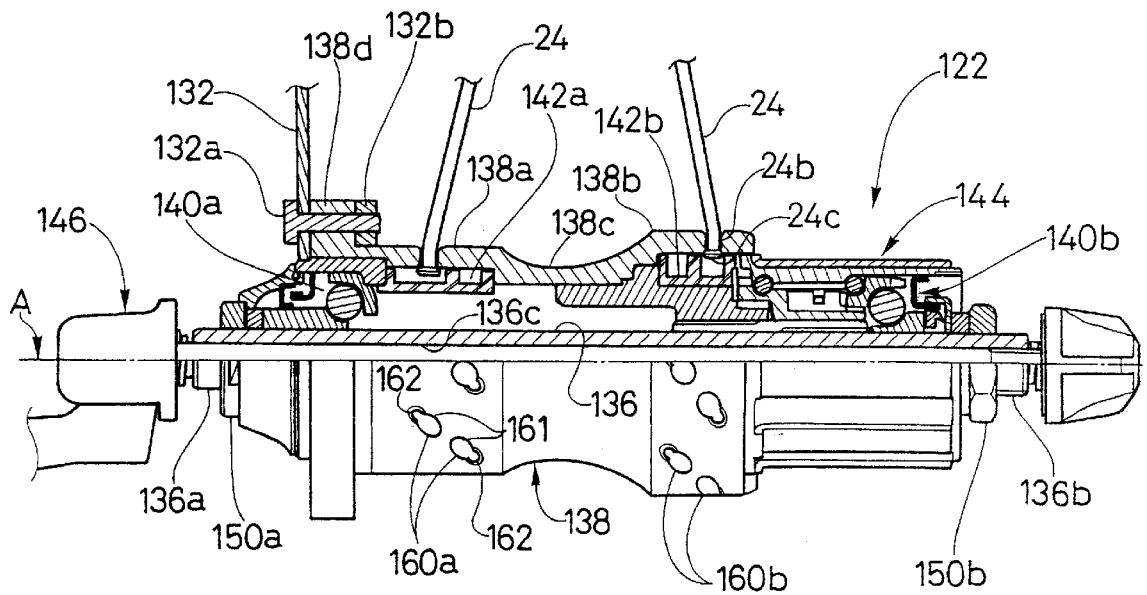
FIG. 27 a side elevational view of the rear brake disc hub illustrated in FIG. 26 in accordance with a second embodiment of the present invention with certain portions Woken away for purposes of illustration.

Referring to FIGS. 26 and 27, the rear hub 122 basically includes a hub axle 136, a hub body 138, a first bearing assembly 140a, a second bearing assembly 140b, a first spoke seal 142a, a second spoke seal 142b, a freewheel 144 and a quick release mechanism 146. The hub axle 136 has a center axis A extending between a first end 136a and a second end 136b.

The quick release mechanism 146 extends through a center bore 136c of the hub axle 136 such that the quick release mechanism 146 is coupled to the hub axle 136 in a conventional manner. The first and second ends 136a and 136b of the hub axle 136 are threaded for receiving a pair of nuts 150a and 150b that applies an axial force on the hub body 138, the bearing assemblies 140a and 140b, the spoke seals 142a and 142b, and the freewheel 144. First and second bearing assemblies 140a and 140b rotatably mount the hub body 138 with the freewheel 144 on the hub axle 136. The freewheel 144 allows the hub axle 136 to rotate freely relative to the hub body 138 in one direction, but fixedly couples the hub axle 136 relative to the hub body 138 in the opposite rotational direction.

A set of first spoke openings 160a are provided at the first end section 138a of the hub body 138 for receiving the bent ends 24b of the spokes 24. Similarly, the second end section 138b of the hub body 138 is provided with a second set of spoke openings 160b for receiving the bent ends 24b of the spokes 24. In the illustrated embodiment, the first end section 138a is provided with eighteen of the first spoke openings 160a and the second end section 138b is provided with eighteen of the second spoke openings 160b. The spoke openings 160a and 160b are grouped into pairs that are equally spaced apart about the circumference of the hub body 138. Accordingly, the rear hub 122 is designed to have thirty-six spokes extending outwardly therefrom in a generally tangential direction.

Preferably, the first and second sets of spoke openings 160a and 160b are arranged identical. The first and second spoke openings 160a and 160b are designed to be used with conventional tangential spokes 24. Of course, it is possible that the first and second sets of spoke openings 160a and 160b can be different such that tangential spokes 24 are used in one end of the hub body 138 and a different types of spokes are used in the other end of the hub body 138. The first spoke openings 160a are circumferentially arranged around the hub body 138 adjacent to the brake rotor attachment portion 138d. Preferably, the first spoke openings 160a are spaced axially inward of the brake rotor attachment portion 138d so that brake disc rotor 132 can be easily attached with the bolts 132a and nuts 132b.

In this embodiment, the spoke openings 160a and 160b are arranged to form two circumferential rows of spoke openings 160a at end section 138a and two circumferential rows of spoke openings 160b at end section 138b. Each of the spoke openings 160a and 160b has an insertion portion 161 and a retaining portion 162. Adjacent pairs of the spoke openings 160a and 160b are oriented in opposite directions so that the spokes 24 extend in generally opposite directions from the hub body 138.

Each insertion portion 161 is formed by a curved or partial cylindrical surface 164 that has a width or diameter that is equal to or slightly larger than the widths or diameters of the enlarged heads 24c of the spokes 24. Thus, the inner ends (bent ends 24b with enlarged heads 24c) of the spokes 24 can be easily inserted into the spoke openings 160a and 160b through the insertion portions 161.

The retaining portions 162 have smaller widths or diameters than the insertion portions 161. More specifically, the diameters or widths of the retaining portions 162 are smaller than the diameters or widths of the enlarged heads 24c of the spokes 24 so as to retain the spokes 24 within the spoke openings 160a and 160b. The retaining portions 162 are each preferably defined by a partial cylindrical surface 166 that is connected to the curved surface 164 of the associated insertion portion 161.

Preferably, the insertion portion 161 and the retaining portions 162 of each spoke opening are formed simultaneously. Also preferably, the inner and outer ends of the retaining portions 162 of the spoke openings 160a and 160b are tapered to avoid sharp edges engaging the spokes 24.

Similar to the first embodiment, discussed above, each of the insertion portions 161 has a center longitudinal axis that passes through the center axis A of the hub axle 136. The retaining portions 162, on the other hand, have center longitudinal axes that are parallel to the center longitudinal axis of the associated insertion portion 161 for each of the spoke openings 160a and 160b. Thus, the center longitudinal axes of the retaining portions 162 do not pass through the center axis of the hub axle 136, similar to the first embodiment. Rather, the center longitudinal axes of the retaining portions 162 are angled with respect to center axis A. Preferably, the center longitudinal axis of each retaining portion 162 is angled between about 5° and about 20° from a radial orientation in the hub body 138. In the illustrated embodiment, the retaining portions 162 are angled about 10° with respect to center axis A for a twenty-six inch rim with thirty-six spoke holes and a hub having a diameter approximately 22 millimeters. For a twenty-six inch rim with thirty-two spoke holes and a hub having a diameter approximately 22 millimeters, the retaining portions 162 are preferably angled about 11° with respect to center axis A. This angled configuration of the retaining portions 162 results in the straight sections 24a of the spokes 24 being easily arranged in a tangential direction relative to an imaginary circle centered on the hub body 138. Moreover, this angled configuration of the retaining portions 162 allows the straight sections 24a of the spokes 24 to be easily aligned with the spoke holes of the rim without significant bending of the spokes 24. In the illustrated embodiment, the spokes 24 are not bent more than about five degrees.

Figure 28:
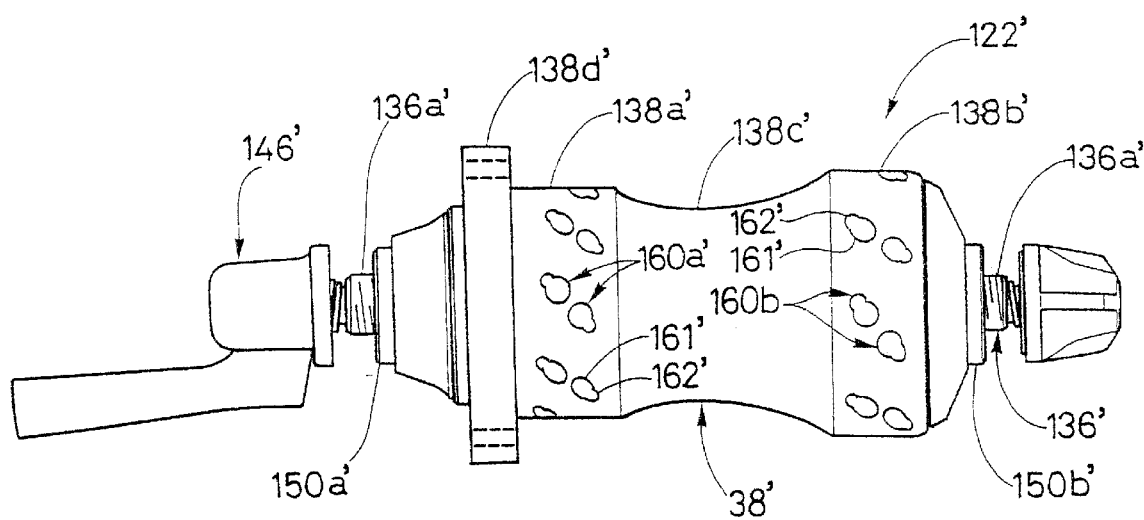
FIG. 28 is a side elevational view of the front brake disc hub in accordance with a second embodiment of the present invention with the sprockets removed.
Figure 29:
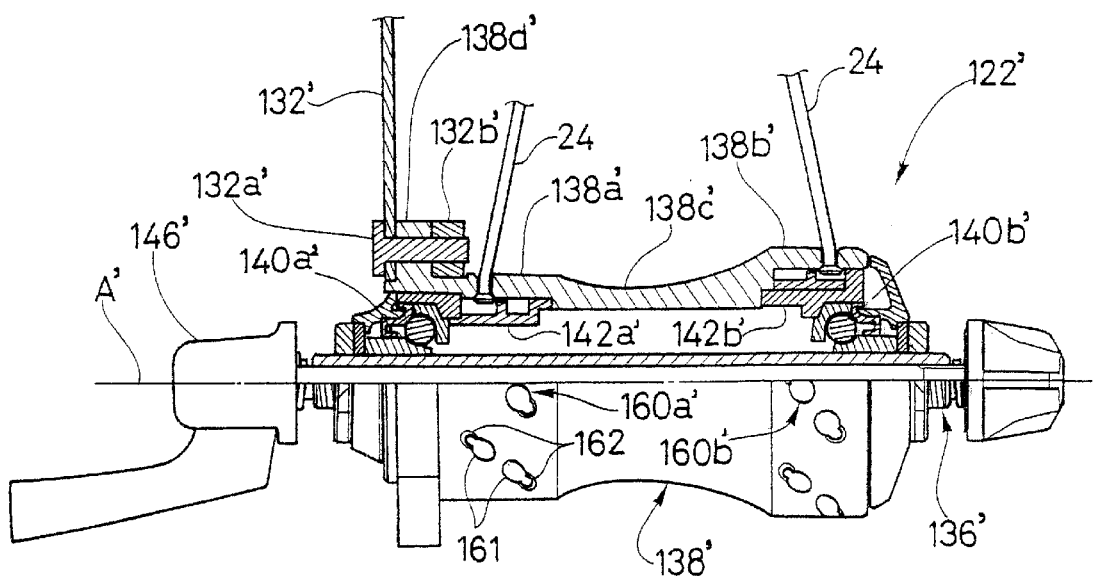
FIG. 29 a side elevational view of the front brake disc hub illustrated in FIG. 28 in accordance with a second embodiment of the present invention with certain portions broken away for purposes of illustration.

Referring to FIGS. 28 and 29, the front hub 122' basically includes a hub axle 136', a hub body 138', a first bearing assembly 140a', a second bearing assembly 140b', a first spoke seal 142a', a second spoke seal 142b', and a quick release mechanism 146'. The hub axle 136' has a center axis A' extending between a first end 136a' and a second end 136b'.

The quick release mechanism 146' extends through a center bore 136c' of the hub axle 136' such that the quick release mechanism 146' is coupled to the hub axle 136' in a conventional manner. The first and second ends 136a' and 136b' of the hub axle 136' are threaded for receiving a pair of nuts 150a' and 150b' that applies an axial force on the hub body 138', the bearing assemblies 140a' and 140b' and the spoke seals 142a' and 142b'. First and second bearing assemblies 140a' and 140b' rotatably mount the hub body 138' on the hub axle 136'.

A set of first spoke openings 160a' are provided at the first end section 138a' of the hub body 138' for receiving the bent ends 24b of the spokes 24. Similarly, the second end section 138b' of the hub body 138' is provided with a second set of spoke openings 160b' for receiving the bent ends 24b of the spokes 24. In the illustrated embodiment, the first end section 138a' is provided with eighteen of the first spoke openings 160a' and the second end section 138b' is provided with eighteen of the second spoke openings 160b'. The spoke openings 160a' and 160b' are grouped into pairs that are equally spaced apart about the circumference of the hub body 138'. Accordingly, the front hub 122' is designed to have thirty-six spokes extending outwardly therefrom in a generally tangential direction.

The first spoke openings 160a' are circumferentially arranged around the hub body 138' adjacent to the brake rotor attachment portion 138d'. Preferably, the first spoke openings 160a' are spaced axially inward of the brake rotor attachment portion 138d' so that brake disc rotor 132' can be easily attached with the bolts 132a' and nuts 132b'.

In this embodiment, the spoke openings 160a' and 160b' are arranged to form two circumferential rows of spoke openings 160a' at end section 138a' and two circumferential rows of spoke openings 160b' at end section 138b'. Each of the spoke openings 160a' and 160b' has an insertion portion 161' and a retaining portion 162'. Adjacent pairs of the spoke openings 160a' and 160b' are oriented in opposite directions so that the spokes 24 extend in generally opposite directions from the hub body 138'.

Each insertion portion 161' is formed by a curved or partial cylindrical surface 164' that has a width or diameter that is equal to or slightly larger than the widths or diameters of the enlarged heads 24c of the spokes 24. Thus, the inner ends (bent ends 24b with enlarged heads 24c) of the spokes 24 can be easily inserted into the spoke openings 160a' and 160b' through the insertion portions 161'.

The retaining portions 162' have smaller widths or diameters than the insertion portions 161'. More specifically, the diameters or widths of the retaining portions 162' are smaller than the diameters or widths of the enlarged heads 24c of the spokes 24 so as to retain the spokes 24 within the spoke openings 160a' and 160b'. The retaining portions 162' are each preferably defined by a partial cylindrical surface 166' that is connected to the curved surface 164' of the associated insertion portion 161'.

Preferably, the insertion portion 161' and the retaining portions 162' of each spoke opening are formed simultaneously. Also preferably, the inner and outer ends of the retaining portions 162' of the spoke openings 160a' and 160b' are tapered to avoid sharp edges engaging the spokes 24.

Similar to the first embodiment, discussed above, each of the insertion portions 161' has a center longitudinal axis that passes through the center axis A' of the hub axle 136'. The retaining portions 162', on the other hand, have center longitudinal axes that are parallel to the center longitudinal axis of the associated insertion portion 161' for each of the spoke openings 160a' and 160b'. Thus, the center longitudinal axes of the retaining portions 162' do not pass through the center axis of the hub axle 136', similar to the first embodiment. Rather, the center longitudinal axes of the retaining portions 162' are angled with respect to center axis A'. Preferably, the center longitudinal axis of each retaining portion 162' is angled between about 5° and about 20° from a radial orientation in the hub body 138'. In the illustrated embodiment, the retaining portions 162' are angled about 10° with respect to center axis A' for a twenty-six inch rim with thirty-six spoke holes and a hub having a diameter approximately 22 millimeters. For a twenty-six inch rim with thirty-two spoke holes and a hub having a diameter approximately 22 millimeters, the retaining portions 162' are preferably angled about 11° with respect to center axis A'. This angled configuration of the retaining portions 162' results in the straight sections 24a of the spokes 24 being easily arranged in a tangential direction relative to an imaginary circle centered on the hub body 138'. Moreover, this angled configuration of the retaining portions 162' allows the straight sections 24a of the spokes 24 to be easily aligned with the spoke holes of the rim without significant bending of the spokes 24. In the illustrated embodiment, the spokes 24 are not bent more than about five degrees.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle hub for use with bicycle spokes, said bicycle hub comprising:

a hub axle having a center axis extending between a first end and a second end;

a hub body having an interior passageway with said hub axle being rotatably supported therein, a set of first spoke openings circumferentially arranged around said hub body, each of said first spoke openings having an insertion portion with a large width that permits an enlarged head portion of a spoke to pass therethrough and a retaining portion with a width that is smaller than said width of said insertion portion to retain the enlarged head portion of the spoke therein; and a seal structure arranged in said interior passageway of said hub body and adjacent said first spoke openings to isolate said first spoke openings from said hub axle, said seal structure including a first maintaining portion positioned to keep the spokes in said retaining portions of said first spoke openings.

2. A bicycle hub according to claim 1, wherein
said first maintaining portion includes a resilient portion.

3. A bicycle hub according to claim 2, wherein
said seal structure is positioned between said hub axle and said hub body to isolate a first interior section of said interior passageway adjacent said first spoke openings.

4. A bicycle hub according to claim 3, wherein
said first interior section of said interior passageway is a continuous annular first space.

5. A bicycle hub according to claim 4, wherein
said first maintaining portion includes a first flange with a first groove formed in its outer peripheral surface.

6. A bicycle hub according to claim 3, wherein
said seal structure includes a first tubular section with said first maintaining portion being a first flange extending radially outward from said first tubular section.

7. A bicycle hub according to claim 6, wherein
said first flange is annular flange that extends in a circumferential direction about said first tubular section.

8. A bicycle hub according to claim 1, wherein
said first spoke openings extend through a tubular portion of said hub body in a generally radial direction.

9. A bicycle hub according to claim 8, wherein
said seal structure includes a first tubular section with said first maintaining portion being a first flange extending radially outward from said first tubular section.

10. A bicycle hub according to claim 1, wherein
said first maintaining portion is an annular flange that is positioned to keep spokes in said retaining portions of said first spoke openings.

11. A bicycle hub according to claim 8, wherein
each of said first spoke openings includes an additional retaining portion to retain the enlarged head portions of two spokes with in each of said first spoke openings.

12. A bicycle hub according to claim 11, wherein
said seal structure includes a first tubular section with said first maintaining portion being a first flange extending radially outward from said first tubular section.

13. A bicycle hub according to claim 12, wherein
said first flange is an annular flange with said first maintaining portion being positioned between ends of said first tubular section to axially separate said insertion portions from said retaining portions of each of said first spoke openings.

14. A bicycle hub according to claim 1, wherein said first spoke openings are arranged to form an outer circumferential row of said first spoke openings and an inner circumferential row of said first spoke openings that is axially spaced along said hub body from said outer circumferential row of said first spoke openings, said outer and inner circumferential rows of said first spoke openings are arranged to form a pair of said first spoke openings comprising one of said first spoke openings of said outer circumferential row and one of said first spoke openings of said inner circumferential row.

15. A bicycle hub according to claim 1, further comprising a freewheel coupled to said second end of said axle adjacent said second end section of said hub body.

16. A bicycle hub according to claim 1, wherein said hub body further includes a set of second spoke openings circumferentially arranged around said hub body at a location that is axially spaced from said first spoke openings, each of said second spoke openings having an insertion portion with a large width that permits an enlarged head portion of a spoke to pass therethrough and a retaining portion with a width that is smaller than said width of said insertion portion of said second spoke openings to retain the enlarged head portion of the spoke therein, and said seal structure further being arranged in said interior passageway of said hub body and adjacent said second spoke openings to isolate said second spoke openings from said hub axle, said seal structure further includes a second maintaining portion being further positioned to keep the spokes in said retaining portions of said second spoke openings.

17. A bicycle hub according to claim 3, wherein said hub body further includes a set of second spoke openings circumferentially arranged around said hub body at a location that is axially spaced from said first spoke openings, each of said second spoke openings having an insertion portion with a large width that permits an enlarged head portion of a spoke to pass therethrough and a retaining portion with a width that is smaller than said width of said insertion portion of said second spoke openings to retain the enlarged head portion of the spoke therein, and said seal structure is further positioned between said hub axle and said hub body to isolate a second interior section of said interior passageway adjacent said second spoke openings, said seal structure further includes a second maintaining portion being positioned to keep the spokes in said retaining portions of said second spoke openings.

18. A bicycle hub according to claim 17, wherein said seal structure includes first and second sealing portions with said first sealing portion being a separate member from said second sealing portion.

19. A bicycle hub according to claim 18, wherein said first interior section of said interior passageway includes a first continuous annular first space, and said second interior section of said interior passageway includes a second continuous annular second space.

20. A bicycle hub according to claim 17, wherein said first maintaining portion includes a first resilient flange with a first groove formed in its outer peripheral surface, and said second maintaining portion includes a second resilient flange with a second groove formed in its outer peripheral surface.

21. A bicycle hub according to claim 20, wherein each of said first and second resilient flanges extend radially outward from a corresponding tubular section.

22. A bicycle hub according to claim 21, wherein said flanges are annular flanges that extends in a circumferential direction about its corresponding said tubular section.

23. A bicycle hub according to claim 18, wherein each of said second spoke openings has an insertion portion with a large width that permits an enlarged head portion of a spoke to pass therethrough and retaining portion with a width that is smaller than said width of said insertion portion of said second spoke openings to retain the enlarged head portion of the spoke therein.

24. A bicycle hub according to claim 23, wherein said first and second spoke openings extend through a tubular portion of said hub body in a generally radial direction.

25. A bicycle hub according to claim 24, wherein said first sealing portion includes a first tubular section with said first maintaining portion being a first flange that extends radially outward from said first tubular section, and said second sealing portion includes a second tubular section wit said first maintaining portion being a second flange that extends radially outward from said second tubular section.

26. A bicycle hub according to claim 25, wherein said first flange is an annular flange that is positioned to keep spokes in said retaining portions of said first spoke openings, and said second flange is an annular flange that is positioned to keep spokes in said retaining portions of said second spoke openings.

27. A bicycle hub for use with bicycle spokes, said bicycle hub comprising:

a hub axle having a center axis extending between a first end and second end;

a hub body having an interior passageway with said hub axle being rotatably supported therein, a set of first spoke openings formed said hub body and arranged circumferentially around said hub body, each of said first spoke openings having an insertion portion with a large width that permits an enlarged head portion of a spoke to pass therethrough and, retaining portion with a width that is smaller than said width of said insertion portion to retain the enlarged head portion of the spoke therein; and a seal arranged in said interior passageway to form a first isolated pace of said interior passageway below said first spoke openings, said seal including a maintain g portion positioned to keep the spokes in said retaining portions of said first spoke openings.

28. A bicycle hub according to claim 27, wherein each of said first and second spoke openings includes an additional retaining portion to retain the enlarged head portions of two spokes with in each of said first and second spoke openings.

29. A bicycle hub according to claim 28, wherein said first isolated space of said interior passageway is a continuous annular first space.

30. A bicycle hub according to claim 29, wherein said seal includes a first tubular section with said first maintaining portion being a first flange extending radially outward from said first tubular section.

* * * * *